(12) United States Patent
Kasuga

(10) Patent No.: US 7,969,524 B2
(45) Date of Patent: Jun. 28, 2011

(54) LIQUID CRYSTAL DISPLAY PANEL, MANUFACTURING METHOD OF THE SAME, AND LIQUID CRYSTAL DISPLAY APPARATUS

(75) Inventor: Koji Kasuga, Kanagawa (JP)

(73) Assignee: NEC LCD Technologies, Ltd., Kanagawa (JP)

(*) Notice: Subject to any disclaimer, the term of this patent is extended or adjusted under 35 U.S.C. 154(b) by 533 days.

(21) Appl. No.: 12/054,423

(22) Filed: Mar. 25, 2008

(65) Prior Publication Data

US 2008/0239191 A1  Oct. 2, 2008

(30) Foreign Application Priority Data

Mar. 30, 2007 (JP) ................... 2007-091130

(51) Int. Cl.
*G02F 1/1333* (2006.01)
*G02F 1/1343* (2006.01)

(52) U.S. Cl. ............................ 349/54; 349/139; 349/141

(58) Field of Classification Search .................. 349/141, 349/139, 54, 43, 149, 151, 152, 155, 65
See application file for complete search history.

(56) References Cited

U.S. PATENT DOCUMENTS

| 5,394,308 A | 2/1995 | Watanabe et al. |
| 6,313,890 B1 | 11/2001 | Tamatani |
| 6,356,330 B1 * | 3/2002 | Ando et al. ................... 349/141 |
| 2007/0040979 A1 * | 2/2007 | Shiota et al. .................. 349/141 |

FOREIGN PATENT DOCUMENTS

| JP | 06-313883 | 11/1994 |
| JP | 08-190104 | * 7/1996 |
| JP | 2001-033782 | 2/2001 |
| JP | 2006-330187 | 12/2006 |

* cited by examiner

*Primary Examiner* — Thoi V Duong
(74) *Attorney, Agent, or Firm* — Young & Thompson

(57) ABSTRACT

A liquid crystal display panel includes a TFT connected to wiring equipped with an input terminal; a pixel electrode connected to the TFT; and a common electrode opposed to the pixel electrode, wherein an electrode spacing between the pixel electrode and the common electrode is adjusted depending on the amount of a signal degradation that arises from a signal flow from the input terminal through the wiring to the TFT.

9 Claims, 20 Drawing Sheets

A-A' CROSS SECTION      B-B' CROSS SECTION

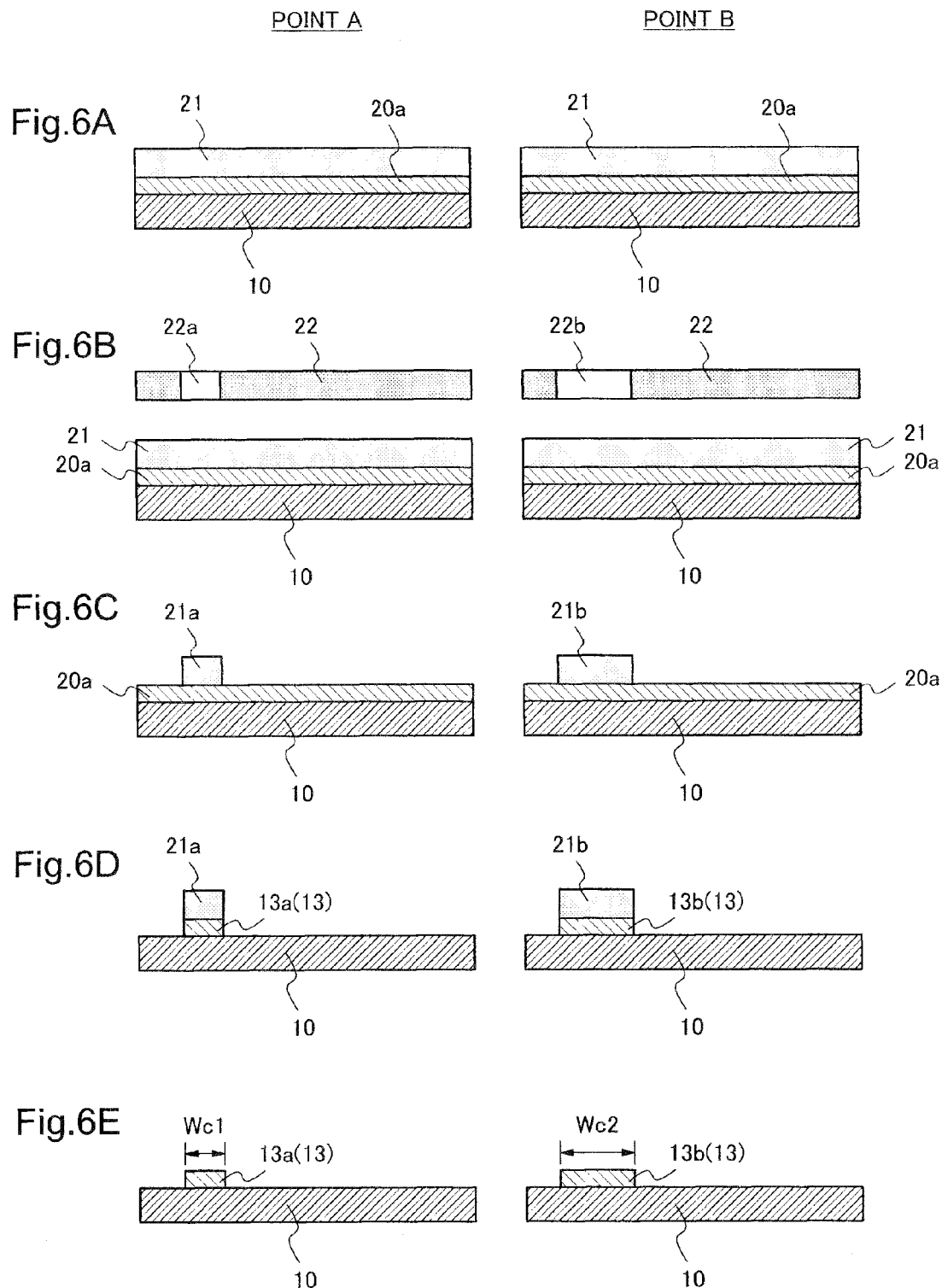

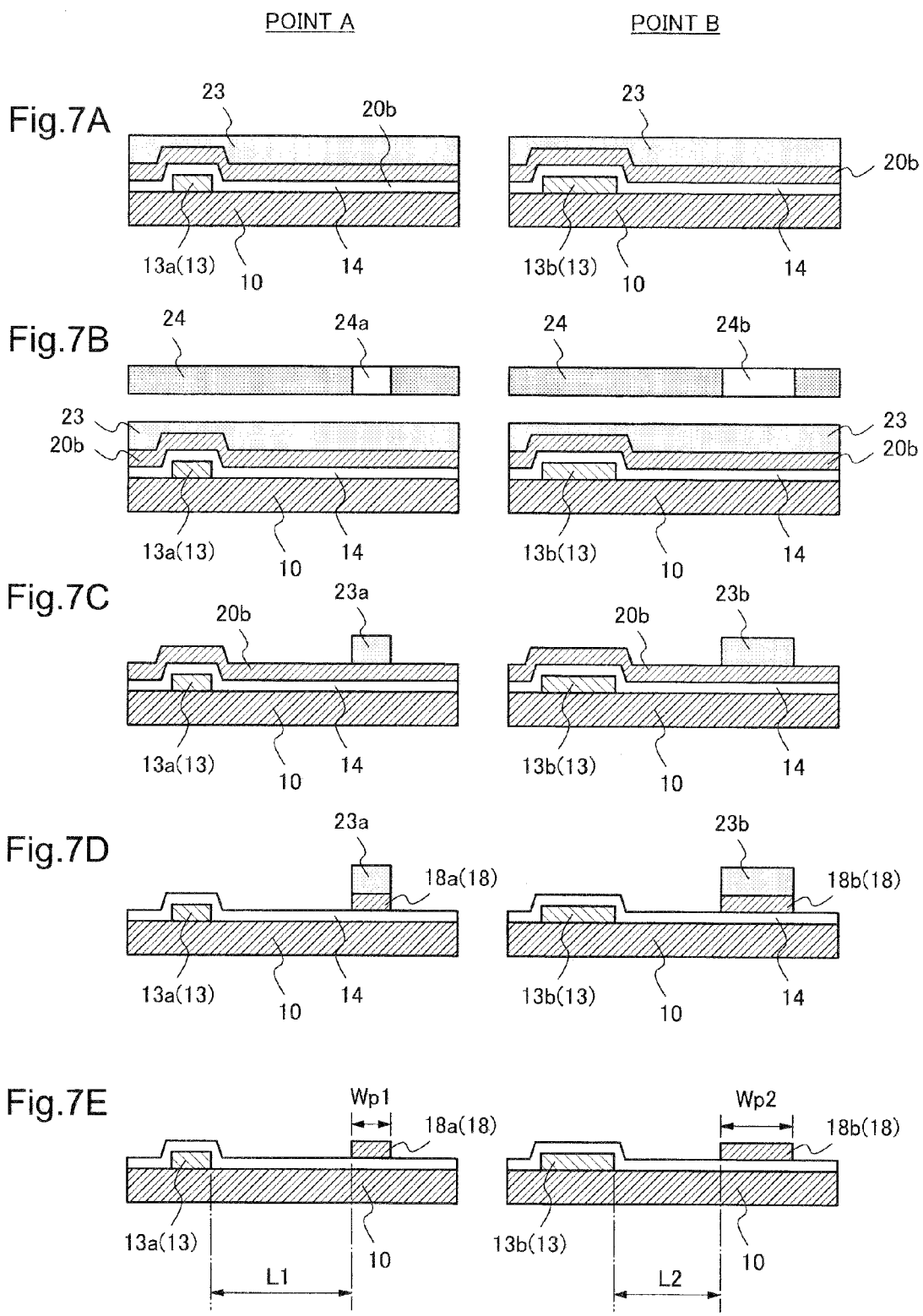

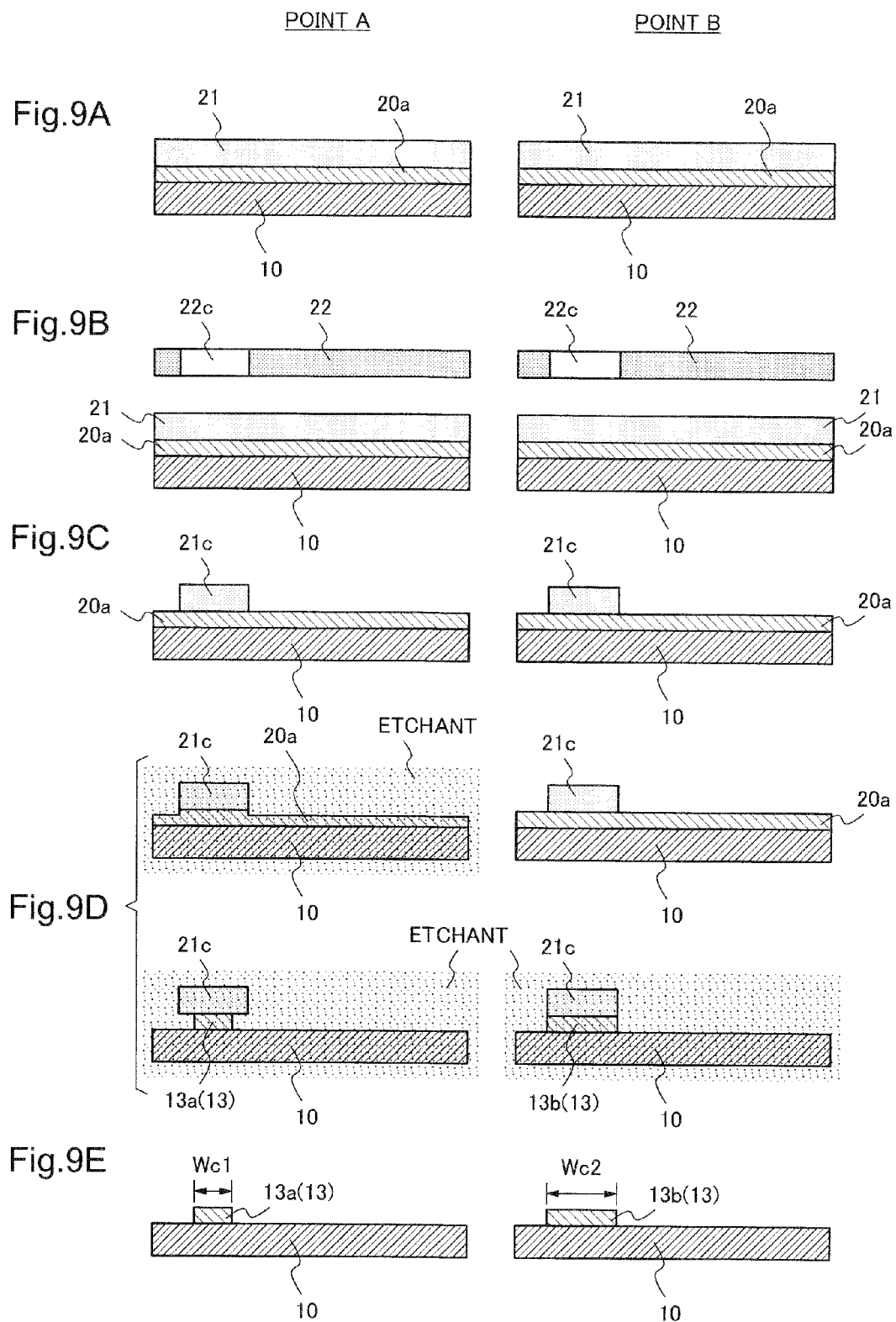

Fig.10A
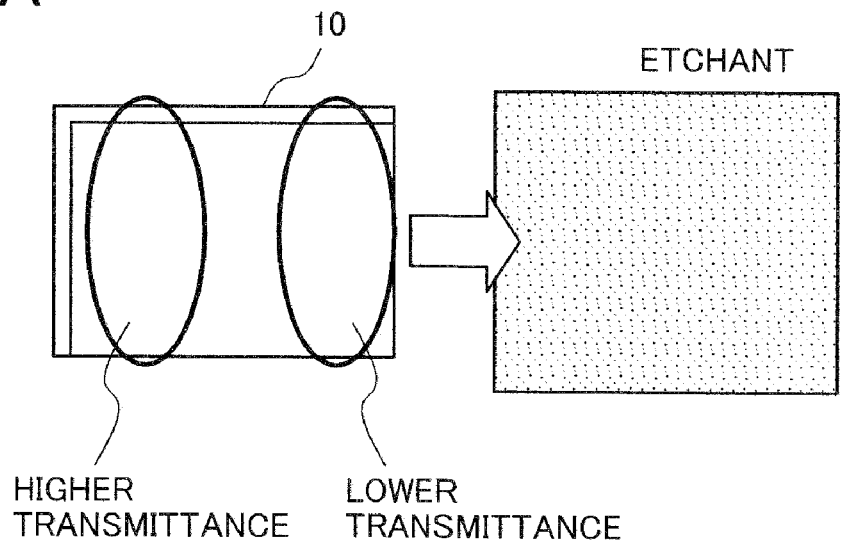
HIGHER TRANSMITTANCE   LOWER TRANSMITTANCE
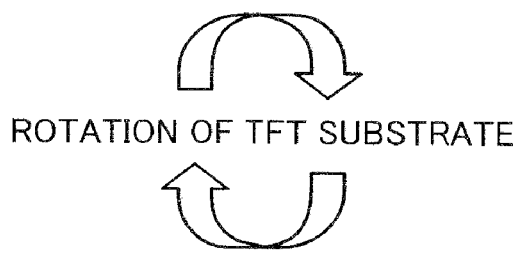
ROTATION OF TFT SUBSTRATE
Fig.10B
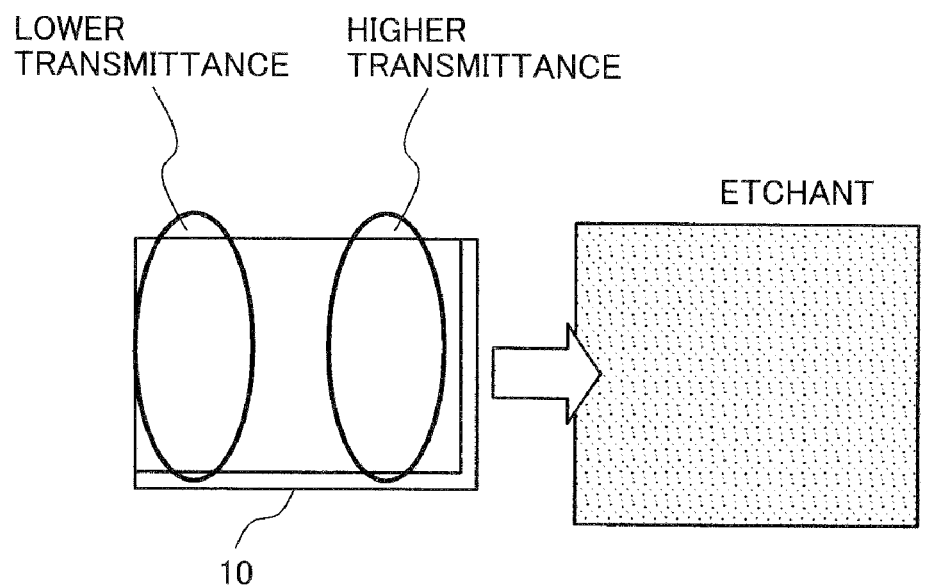

LIQUID CRYSTAL DISPLAY PANEL, MANUFACTURING METHOD OF THE SAME, AND LIQUID CRYSTAL DISPLAY APPARATUS

INCORPORATION BY REFERENCE

This application is based upon and claims the benefit of priority from Japanese Patent Application No. 2007-091130, filed on Mar. 30, 2007, the disclosure of which is incorporated herein in its entirety by reference.

BACKGROUND OF THE INVENTION

1. Technical Field

The present invention relates to a liquid crystal display panel, a manufacturing method of the panel, and a liquid crystal display apparatus.

2. Background Art

A liquid crystal display (LCD) apparatus with many advantages such as thin, light weight, and low power consumption is used for many kinds of equipments such as Audio Visual equipments and Office Automation equipments.

FIG. 15 is a cross sectional view of a LCD apparatus. This LCD apparatus includes a LCD panel 32 and a backlight unit 33 as the main components. A LCD panel 32 includes a TFT (Thin Film transistor) substrate 34, an opposed substrate 36, a liquid crystal 35, and a sealant 38.

The TFT substrate 34 includes a plurality of switching elements such as TFTs being arranged in a matrix form. The opposed substrate 36 includes a color filter and a black matrix and the like. A liquid crystal 35 is arranged in a space between the TFT substrate 34 and the opposed substrate 36. Each of the TFT substrate 34 and the opposed substrate 36 is included with a polarizing plate 37. The sealant 38 is provided on a periphery of a LCD panel 32

As shown in FIG. 16, the TFT substrate 34 includes a scanning line 41, a data line 43, and a common line 42. A TFT includes a gate electrode, a drain electrode, and a source electrode. The gate electrode is connected to the scanning line 41, the drain electrode is connected to the data line 43, and the source electrode is connected to a pixel electrode 39. The common line 42 is a wiring for applying definite common voltage to a common electrode 40.

As shown in FIG. 16, the TFT substrate 34 has a display area 44 where TFTs are arranged in a matrix form, and has a terminal area 45 in a periphery of the display area 44. The terminal area 45 includes a terminal block 45a to work as a scanning line input terminal (first input terminal) for the scanning line 41, and a terminal block 45b to work as a data line input terminal (second input terminal) for the data line 43.

As a result, a scanning signal inputted from the first input terminal in the terminal block 45a performs an on/off control of this TFT, by entering into the gate electrode of the TFT flowing the scanning line 41. A data signal inputted from the second input terminal in the terminal block 45b flows the data line 43 and enters into the drain electrode of the TFT.

Then, when the TFT goes into an ON state, the data signal inputted to the drain electrode is applied to the pixel electrode 39 via the source electrode. As a result, an electric field arises between the pixel electrode 39 and the common electrode 40, and this field rotates liquid crystal molecules. Transmittance through the panel for the light from the backlight unit 33 changes, depending on the rotation angle of the liquid crystal molecules.

In FIG. 15, a symbol E denotes the electric field between the pixel electrode 39 and the common electrode 40. A heavy line arrow K1 indicates light from the backlight unit 33, and a heavy line arrow K2 indicates light which transmits the LCD panel 32.

Since a plurality of TFTs in pixels are connected to the scanning lines 41 and the data lines 43, the distance of each TFT from the terminal area 45 is different depending on the position of each pixel. A pixel at point A is illustrated by an example in FIG. 16 as a pixel in the position near the terminal area 45. And, a pixel at point B is illustrated by an example in FIG. 16 as a pixel in the position far from the terminal area 45.

Hereinafter, the pixel in the position near the terminal area 45 is described as point A, and the pixel in the position far from the terminal area 45 is described as point B. A scanning signal S1 inputted from the first input terminal in the terminal block 45a exhibits "delay", "distortion of the signal waveform", and "decline of the signal level" during flowing through the scanning line 41 because of the resistance of the line. In FIG. 16, a scanning signal S1a indicates the scanning signal S1 at point A, and a scanning signal S1b indicates the scanning signal S1 at point B.

Similarly, a data signal S2 inputted from the second input terminal in the terminal block 45b exhibits "delay", "distortion of the signal waveform", and "decline of the signal level" during flowing through the data line 43 because of the resistance of the line. In FIG. 16, a data signal S2a indicates the data signal S2 at point A, and a data signal S2b indicates the data signal S2 at point B.

In FIG. 17A, the vertical axis represents the value of the scanning signal S1a, the data signal S2a, and a common voltage S3 at point A, and the horizontal axis represents time. And in FIG. 17B, the vertical axis represents the scanning signal S1b, the data signal S2b and the common voltage S3 at point B, and the horizontal axis represents time. As shown in FIG. 17A, the waveforms of the scanning signal S1a and the data signal S2a at point A indicate almost the same rectangular shape as the waveform inputted to the first input terminal in the terminal block 45a. On the other hand, as shown in FIG. 17B, the waveforms of the scanning signal S1b and the data signal S2b at point B exhibit "delay", "distortion of the signal waveform", and "decline of the signal level" from the waveform, as shown in FIG. 17A, inputted to the second input terminal in the terminal block 45b.

Meanwhile, symbols Va, Vb in FIGS. 17A and 17B denote the maximum voltage differences between the pixel electrode 39 and the common electrode 40, respectively, and reveals the magnitude relation of Va>Vb. Hereinafter, "delay", "distortion of signal waveform", and "decline of signal level" of the scanning signal and the data signal are collectively called as "signal degradation".

FIG. 18 illustrates the characteristics of gate voltage versus drain current. Since the scanning line 41 is connected to the gate electrode of the TFT, fluctuation of the signal level of the scanning signal S1 causes fluctuation of the gate voltage. As the gate voltage fluctuates, the drain current shows different values.

The pixel electrode 39 and the common electrode 40 form a pair of electrodes of a capacitor. For this reason, a charged voltage and a charging time of the capacitor becomes different when the drain current flowing into the pixel electrode 39 changes. By the difference in such a charged voltage, liquid crystal molecules of different pixel are exposed to different electric field strength, thereby causing the difference in transmittance among pixels. Because the data line 43 has resistance similar to the scanning line 41, the drain current flowing into the TFT exhibits different values depending on the wiring resistance from the second input terminal in the terminal block 45b to the TFT.

Thus, by the delay and the like of the scanning signal S1 and the data signal S2, the transmittance differs among pixels. For this reason, the transmittance of the TFT substrate 34 shown in FIG. 16 partly declines, for example, in the order of upper left, lower left, upper right, and lower right. Thus the TFT substrate 34 exhibits the non-uniform transmittance distribution. Therefore, even if the backlight unit 33 illuminates with a uniform brightness over a surface of the TFT substrate 34, the LCD apparatus exhibits the display luminance distribution depending on the transmittance distribution.

To solve the above-mentioned problem, one possible method is to reduce the non-uniform distribution of the display luminance by controlling the brightness distribution of the backlight unit in accordance with the transmittance distribution.

For example, in a LCD apparatus with a backlight unit of an edge light system, a method to improve the uniformity of the display luminance distribution, by changing a reflector density in a light guide plate, is disclosed in Japanese Patent Application Laid-Open No. Hei 6-313883 (Document 1).

Another method to improve the uniformity of the display luminance distribution of a LCD apparatus, including a circuit to control brightness of a lamp, and a circuit to calculate a brightness correction factor for the lamp from a display data, is disclosed in Japanese Patent Application Laid-Open No. 2006-330187 (Document 2).

The TFT substrate 34 in FIG. 16 has a so-called one side extraction structure in which the terminal area 45 is arranged on one side around the LCD panel 32. On the other hand, the TFT substrate 34 may have a so-called double-side extraction structure in which the scanning line 41 and the data line 43 are divided into left and right sides, or top and bottom sides, and the terminal area 45 is arranged on the left and right sides, or on the top and bottom sides, respectively. In this structure, the distance from a terminal area 45 to the farthest TFT becomes shorter, thus the signal degradation by the wiring resistance becomes smaller.

In addition, non-uniform display luminance distribution of a LCD apparatus is also caused by non-uniform brightness distribution of a light source such as a backlight unit, besides the above mentioned existence of the wiring resistance of the scanning line 41 and the data line 43. Concerning this problem, Japanese Patent Application Laid-Open No. 2001-33782 (Document 3) proposes a method to control the transmittance distribution of a LCD apparatus so that the non-uniform brightness distribution of a flat light source can be compensated.

By the way, uniformity of the display luminance that is one of the image quality performances of a LCD apparatus is sometimes expressed in a specification by specifying luminance uniformity in full contrast display mode. However, concerning the image quality of the display apparatus for medical use, some specific standard values (or the request values) different from that for a conventional liquid crystal television are set, as shown in Table 1, like DIN (the industry standard of Germany: Deutsches Institut fur Normung e.V.), AAPM (the standard of the American medical physical society: American Association of Physicists in Medicine), and the like. Such regulations are requesting high uniformity of luminance in halftone display mode, in order to find out an affected part from an X-ray picture, for example.

TABLE 1

|  | DIN | AAPM - TG18 |
|---|---|---|
| EVALUATION POINT | CENTER AND CORNER | CENTER AND CORNER |
| DISPLAY CONDITION | GRAY LEVEL: 50% OF MAXIMUM SIGNAL | GRAY LEVEL: 10% OF MAXIMUM SIGNAL GRAY LEVEL: 80% OF MAXIMUM SIGNAL |
| EVALUATION FUNCTION | $\frac{(\text{CORNER LUMINANCE} - \text{CENTER LUMINANCE})}{\text{CENTER LUMINANCE}} \times 100\,(\%)$ | $\frac{(\text{MAXIMUM LUMINANCE} - \text{MINIMUM LUMINANCE})}{(\text{MAXIMUM LUMINANCE} + \text{MINIMUM LUMINANCE})} \times 200\,(\%)$ |
| SPECIFICATION | ±15% | ±30% |

Hence, for a LCD apparatus to be used also in the medical use, uniform luminance is required not only in full contrast display mode but also in halftone display mode. However, the difference in the transmittance caused by the above mentioned signal degradation becomes more serious in halftone display mode than in full contrast display mode. For this reason, the problem arises that luminance uniformity in halftone display mode becomes below the standard forms, even if luminance uniformity in full contrast display mode is within the standard.

FIG. 19 shows the voltage versus transmittance characteristics for a LCD panel. A full contrast display mode for a LCD panel is usually set in a voltage region R1 where the voltage-transmittance characteristics becomes flat. However, in such a setting, the voltage region for halftone display mode goes into the region R2 where voltage-transmittance characteristics changes steeply. Since the signal degradation affection appears more seriously in the region R2, the non-uniformity of display luminance distribution becomes larger in the halftone display mode.

FIG. 20A illustrates a surface of the TFT substrate 34 separated into a plurality of areas. FIG. 20B indicates the transmittance of each area in full contrast display mode, while FIG. 20C indicates the transmittance of each area in halftone display mode. As shown in FIG. 20B, when displayed in full contrast display mode the difference in the transmittance in each area is not so large. However, as shown in FIG. 20C, when displayed in halftone display mode, the transmittance for areas c and f away from the terminal area 45 tends to decline more substantially than the transmittance for areas a and d near the terminal area 45.

To this problem, the method, disclosed in the above-mentioned patent document 1, to adjust the light source brightness so that the luminance in halftone display mode becomes uniform can be applied. However, if the LCD adjusted in this way is operated by full contrast display mode, significant non-uniformity of luminance distribution will occur. This is because adjusting the light source brightness so that the luminance in halftone display mode becomes uniform is equivalent to making the brightness distribution of a light source non-uniform. Accordingly, when the LCD panel is operated in full contrast display mode, light from the light source with non-uniform brightness distribution transmits just as it is.

According to the method of the above-mentioned patent document 2, even when the transmittance distribution of the LCD panel is different between in full contrast display mode and in halftone display mode, the transmittance of the LCD panel can be adjusted by arbitrarily controlling distribution of brightness of the light source. However, in order to perform such control, a very complicated and expensive a light source controller is needed.

The problem that the luminance distribution is different between in halftone display mode and in full contrast display mode cannot be solved even in the double-side extraction structure of dividing the scanning line 41 and the data line 43, because wiring resistance does not vanish in any case.

In the above-mentioned patent document 3, methods of controlling the transmittance distribution of the LCD apparatus are disclosed, which include the methods to define a thickness of the liquid crystal layer, a ratio of light transmission area, and an electrode spacing of a comb-like shape electrode. However, since these methods can only be applied to the case of non-uniform brightness distribution of a light source, the methods cannot resolve the problem which is caused by wiring resistance of the scanning line 41 and the data line 43 and, thus, is independent of non-uniform distribution of brightness of a light source.

SUMMARY

An object of the invention is to provide a LCD panel with uniform luminance distribution over an entire panel both in full contrast display mode and in halftone display mode, a manufacturing method of the LCD panel, and a LCD apparatus.

A LCD panel according to an exemplary aspect of the present invention includes a TFT connected to wiring equipped with an input terminal; a pixel electrode connected to the TFT; and a common electrode opposed to the pixel electrode, wherein an electrode spacing between the pixel electrode and the common electrode is adjusted depending on the amount of a signal degradation that arises from a signal flow from the input terminal through the wiring to the TFT.

BRIEF DESCRIPTION OF THE DRAWINGS

Exemplary features and advantages of the present invention will become apparent from the following detailed description when taken with the accompanying drawings in which:

FIGS. 6A to 6E show process sectional views indicating the part of the method of manufacturing the TFT substrate according to the first exemplary embodiment;

FIGS. 7A to 7E are process sectional views for the steps showing a part of the method of manufacturing the TFT substrate according to the first exemplary embodiment;

FIGS. 9A to 9E show process sectional views indicating the part of the method of manufacturing the TFT substrate according to the second exemplary embodiment;

FIGS. 10A and 10B illustrate etching steps according to the second exemplary embodiment;

EXEMPLARY EMBODIMENT

Exemplary embodiments of the present invention will now be described in detail in accordance with the accompanying drawings.

In a LCD apparatus, an In Plane Switching (IPS) type one is well known to have wide viewing angles by applying an electric field to a liquid crystal in a direction parallel to a TFT substrate surface.

An optical threshold voltage Vc of a liquid crystal in an IPS type is expressed as in the formula (1):

$$Vc = (\pi \times L/d)(K_{22}/(\epsilon_0 \times \Delta\epsilon))^{1/2} \qquad (1)$$

where, L: electrode spacing
d: substrate interval
$K_{22}$: A twist elastic constant of liquid crystal
$\epsilon_0$: Vacuum permittivity
$\Delta\epsilon$: Dielectric anisotropy of liquid crystal The formula (1) shows that following methods are effective for reducing the optical threshold voltage Vc of a liquid crystal to reduce the electrode spacing L between the pixel electrode and the common electrode, and to extend the substrate interval d between the TFT substrate and the opposed substrate.

Considering the relation between a driving voltage and the transmittance for the LCD panel, the relative transmittance of the LCD panel becomes larger for the same driving voltage when the optical threshold voltage Vc of a liquid crystal becomes smaller.

Then, nonuniformity of the transmissivity distribution resulting from degradation of the signal by the wiring resistance of the scanning line and the data line is improved by changing the structure of a LCD panel.

For this purpose, one possible method is to vary electrode widths of the pixel electrode and the common electrode so that the electrode spacing L between the pixel electrode and the common electrode is relatively smaller for a pixel in an area where the transmittance declines by the signal degradation. Another possible method is to vary the height of the columnar spacer or the thickness of the insulating film so that the substrate interval d between a TFT substrate and an opposed substrate becomes relatively larger.

Figure 1:
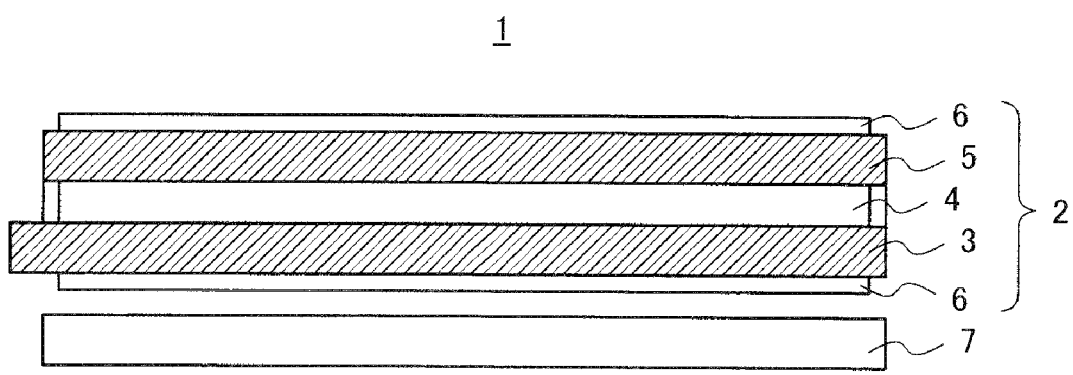
FIG. 1 is a cross sectional view showing the composition of the LCD apparatus according to the first exemplary embodiment.

The detail description will be described with reference to drawings. First, the first exemplary embodiment is described. FIG. 1 is a cross sectional view showing a composition of a LCD apparatus.

A LCD apparatus 1 is equipped with a backlight unit 7, and a LCD panel 2; including a TFT substrate 3, an opposed substrate 5, a liquid crystal 4, and a polarizing plate 6. A TFT substrate 3 is a substrate on which a plurality of switching elements such as TFTs are formed in a matrix form, and an opposed substrate 5 is a substrate opposing to a TFT substrate 3.

A liquid crystal 4 is sandwiched between the TFT substrate 3 and the opposed substrate 5. A polarizing plate 6 is arranged on the TFT substrate 3 and the opposed substrate 5. The backlight unit 7 is arranged outside the TFT substrate 3, and illuminates a LCD panel 2.

Figure 2:
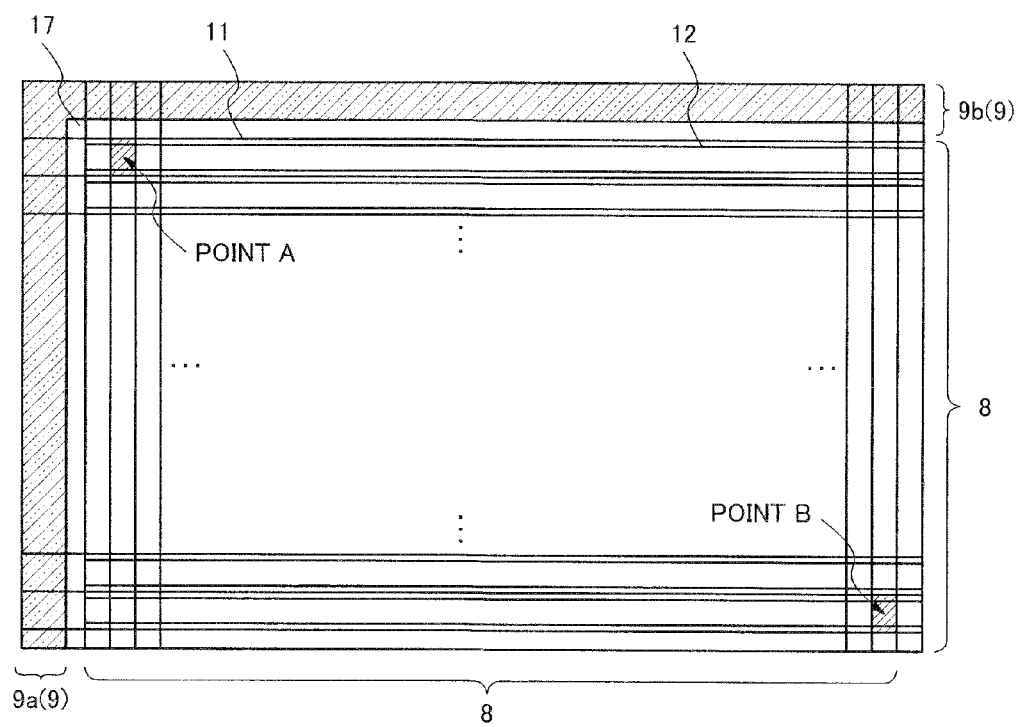
FIG. 2 is a top view showing the composition of the TFT substrate according to the first exemplary embodiment.

FIG. 2 is a top view showing the composition of the TFT substrate. Although the TFT substrate 3 is made horizontally long in FIG. 2, the ratio of the height and width is optional. The TFT substrate 3 includes a scanning line 11, a common line 12, and a data line 17. A plurality of scanning lines 11, common lines 12, and data lines 17 are formed in the predetermined directions, respectively.

In FIG. 2, a case is indicated where the scanning line 11 is formed in a horizontal direction, the data line 17 is formed in a direction perpendicular to the scanning line 11, and the common line 12 is formed parallel to the scanning line 11. Each pixel is arranged in the area enclosed by the scanning line 11 and the data line 17, and a set of these pixels forms a display area 8. Terminal area 9 provided with terminal block 9a and terminal block 9b is formed in the perimeter side of viewing area 8. Input terminal of scanning line 11 is formed in terminal block 9a, and line input terminal of data line 17 is formed in terminal block 9b.

Figure 3:
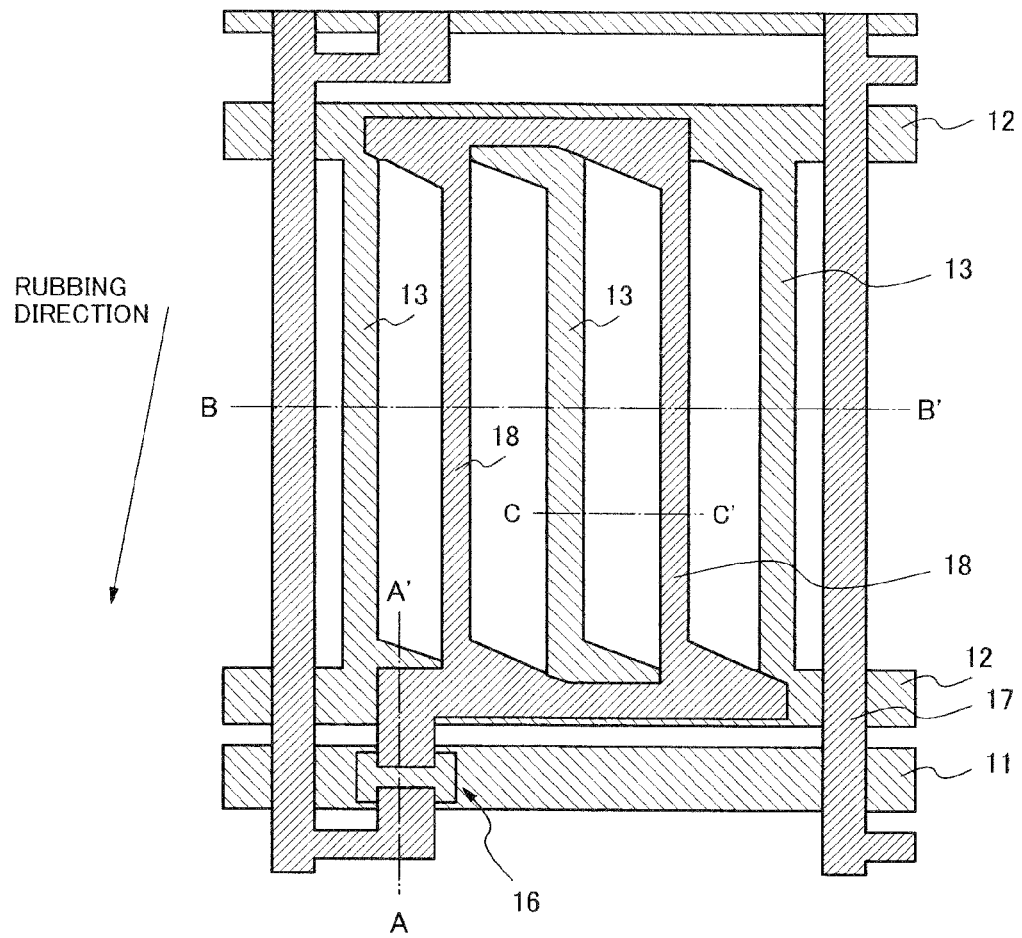
FIG. 3 is a top view showing the composition of one pixel of the TFT substrate according to the first exemplary embodiment.
Figures 4A, 4B:
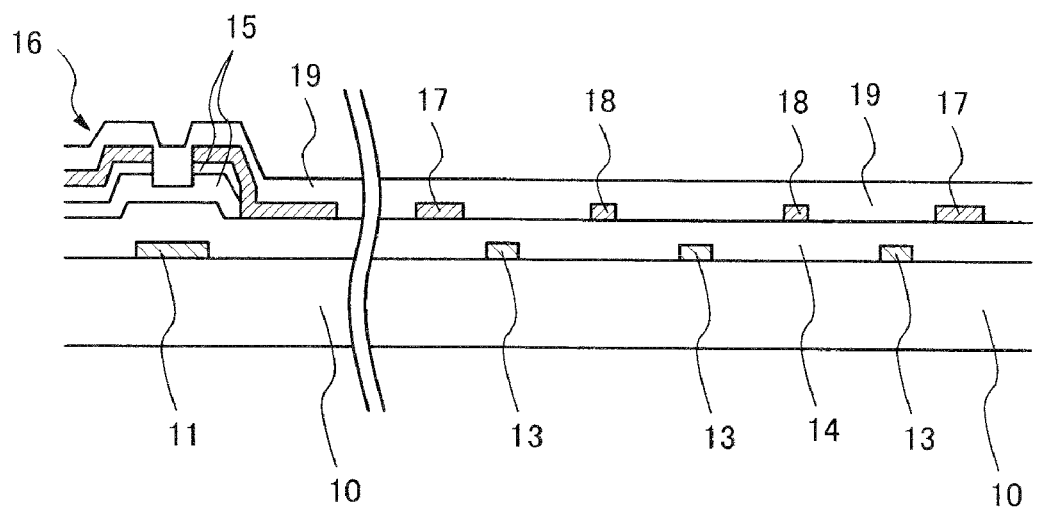
FIGS. 4A and 4B are cross sectional views showing the composition of one pixel of the TFT substrate according to the first exemplary embodiment.

FIG. 3 is a top view showing the composition of one pixel of the TFT substrate. FIG. 4A is a cross sectional view taken along line A-A' in FIG. 3, and a FIG. 4B is a cross sectional view taken along line B-B' in FIG. 3.

The pixel includes the TFT 16 formed in the neighborhood of the intersection of the scanning line 11 and the data line 17, the pixel electrode 18 in a comb-like shape, and the common electrode 13 opposed to this pixel electrode 18. The pixel electrode 18 is connected to the source electrode of the TFT 16, and the common electrode 13 is connected to the common line 12.

On the other hand, although not shown in drawings, a color layer, a black matrix, and a protection film are formed on the opposed substrate 5. A color layer includes each RGB color layer for performing a color display, and the black matrix is to cut light entering into space between each color layer. Protection films protect a color layer and a black matrix.

An alignment film on which rubbing treatment is performed in the predetermined direction is applied to the surface of the TFT substrate 3 and the opposed substrate 5. Columnar spacers are installed in a space between the TFT substrate 3 and the opposed substrate 5, thereby defining the interval between the substrates. A liquid crystal 4 is filled in the space between the substrates. A fixed common voltage is applied via the common lines 12 to all the common electrodes 13.

When the TFT 16 is switched on, an electric potential is impressed on the pixel electrode 18, which generates a horizontal electric field between the pixel electrode 18 and the common electrode 13. By this horizontal electric field the liquid crystal 4 performs twist transformation in the plane parallel to the substrate, thus the transmittance changes.

As shown in FIG. 2, the transmittance of each pixel exhibits difference corresponding to the signal degradation caused by the wiring resistance, because the length of the scanning line 11 and the data line 17 from the terminal area 9 to each pixel differs. According to the formula (1), when the electrode spacing L between the pixel electrode 18 and the common electrode 13 is made smaller, relatively higher transmittance is obtained, even if the optical threshold voltage Vc of the liquid crystal is made small. Accordingly, in this exemplary embodiment, the electrode spacing L is set in relation to the distance from the terminal area 9 to each pixel.

Figure 5A:
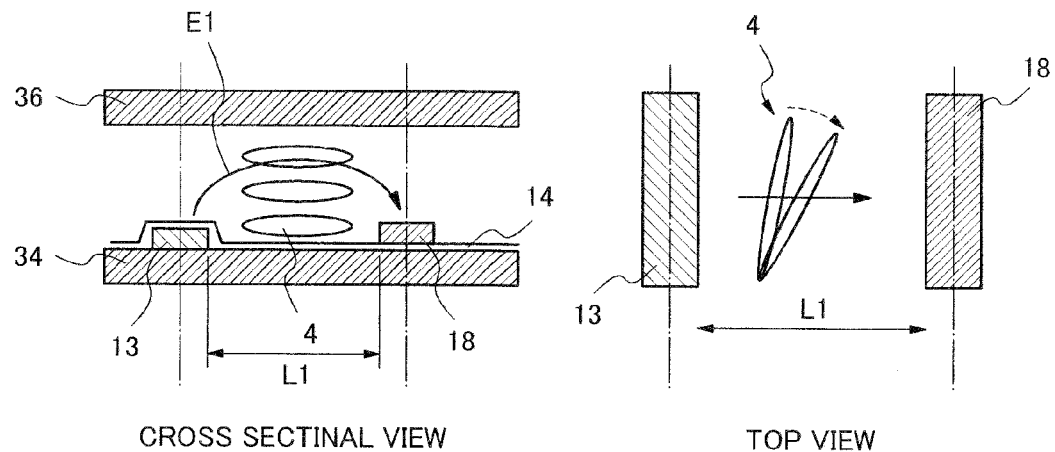
FIGS. 5A and 5B are cross sectional views and top views which illustrate the part of the pixels in areas of relatively far from and relatively near to the input terminal for the scanning line or the data line, according to the first exemplary embodiment.
Figure 5B:
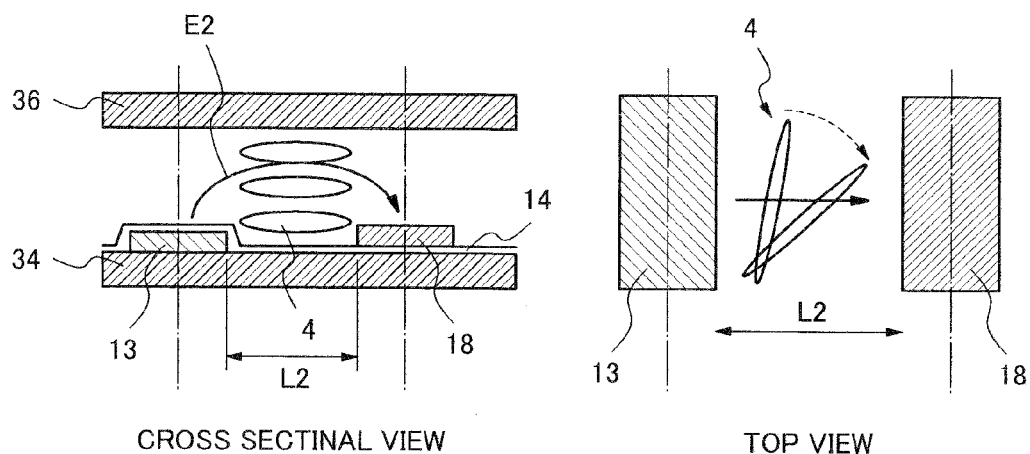

FIG. 5A and FIG. 5B illustrate cross sectional views taken along C-C' line in FIG. 3 and related top views. FIG. 5A illustrates the cross sectional view and the top view which indicate the part of the pixel at point A, and FIG. 5B illustrates the cross sectional view and the top view which indicate the part of the pixel at point B.

The electrode spacing L between the pixel electrode 18 and the common electrode 13 is chosen so that the electrode spacing L2 of the pixel at point B is smaller than the electrode spacing L1 at point A (L1>L2). Even if the difference in electric potential between the pixel electrode 18 and the common electrode 13 is small at point B, the electric field E2 can be made equal to the electric field E1 by selecting smaller electrode spacing L2 (E1=E2). Because the pixel interval is determined from the viewpoint of the display specification, a method to vary electrode widths of the pixel electrode 18 and the common electrode 13 is adopted in this exemplary embodiment.

In addition, a double-side extraction structure may also be used, although in FIG. 2, the terminal block 9b is placed on one long side of the TFT substrate 3, and the terminal block 9a is placed on one short side of the TFT substrate 3.

Although two common lines 12 are arranged for one pixel in FIG. 3, the number and configuration of the common line 12 do not restrict the present invention, as well.

Although two pixel electrodes 18 and three common electrodes 13 are arranged in one pixel in FIG. 3, FIG. 4A and FIG. 4B, the number and the shape of the pixel electrode 18 and the common electrode 13 do not restrict the present invention.

Although the common line 12 and the common electrode 13 are formed in the same layer in FIG. 3, FIG. 4A and FIG.

4B, another configuration is applicable in which a common electrode 13 is formed in an upper layer of an interlayer insulating film 19 and a common electrode 13 and a common line 12 is connected to each other. In this case, a contact hole is formed through an interlayer insulating film 19, and a common electrode 13 and a common line 12 are connected through this contact hole.

Meanwhile, a common electrode 13 may be formed with a transparent conductor like ITO (indium tin oxide). In this case, there is an advantage that the area of the light transmission region does not decrease, even if the width of a common electrode 13 is made wider.

Although the TFT 16 in FIG. 4A is illustrated as an inverted stagger type (a bottom gate electrode type) in which a source electrode and a drain electrode are formed on the upper side of the gate electrode, a TFT may also be a stagger type (a top gate electrode type) in which a source electrode and a drain electrode are formed on the underside of the gate electrode.

Although FIG. 5 illustrates the case in which both widths of the pixel electrode 18 and the common electrode 13 are varied, another case is possible in which the electrode spacing L between the pixel electrode 18 and the common electrode 13 is varied by changing either one electrode width among the pixel electrode 18 or the common electrode 13.

Next, a method of manufacturing the TFT substrate in this exemplary embodiment will be described with reference to process sectional views of FIG. 6 and FIG. 7. FIGS. 6A to 6E and FIG. 7A to 7E are process sectional views showing a part of the manufacturing steps for the TFT substrate at point A and point B. In addition, the left side of FIG. 6 and FIG. 7 indicate a part of the pixel at point A in FIG. 2, and the right side indicates a part of the pixel at point B in FIG. 2.

First, a formation process of the common electrode 13 will be described with reference to FIG. 6A to 6E. A metal 20a of Cr or the like which becomes the material of the scanning line 11, the common line 12, and the common electrode 13 is deposited using a sputtering method or the like on an insulating substrate 10 of glass, plastics, or the like. Then, a resist 21 is coated upon this metal 20a, and the resist 21 is dried afterwards (refer to FIG. 6A).

Next, the resist 21 is patterned using an exposure mask 22 (refer to FIG. 6B). This exposure mask 22 has openings 22a and 22b which transmits light, and the opening 22b has larger opening width than that of the opening 22a. The opening 22a corresponds to the electrode width of the common electrode 13 at point A, and the opening 22b corresponds to the electrode width of the common electrode 13 in the area with lower transmittance like at point B. After exposure is completed, a part of the resist 21 which is not exposed to light is removed using a developing fluid, and the resist patterns 21a and 21b are formed (refer to FIG. 6C).

Next, the metal 20a is etched with an etching mask of resist patterns 21a and 21b (refer to FIG. 6D). Afterward, the resist patterns 21a and 21b are removed using an ashing, an organic solvent, or the like (refer to FIG. 6E). As a result, the common electrodes 13a and 13b are completed. The common electrode 13a in the area of higher transmittance has a narrower electrode width Wc1 corresponding to the resist pattern 21a. And the common electrode 13b in the area of lower transmittance has a wider electrode width Wc2 corresponding to the resist pattern 21b.

Next, an island-shaped semiconductor layer 15 as shown in FIG. 4A is formed. This process is achieved along the following steps, although not shown in drawings. First, a gate electrode insulating film 14 is formed by using a plasma CVD method or the like. As the gate electrode insulating film 14, a silicon oxide film or a silicon nitride film can be used, as an example. Amorphous silicon, polysilicon, or the like is deposited on this gate electrode insulating film 14, and a resist is coated on the amorphous silicon or the polysilicon layer successively.

Next, the resist pattern corresponding to the semiconductor layer 15 is formed, after exposure is performed by using an exposure mask with openings corresponding to the semiconductor layer 15. Amorphous silicon, polysilicon, or the like is etched by dry etching or the like with the resist pattern as an etching mask. As a result, the island-shaped semiconductor layer 15 can be formed.

Next, manufacturing steps of the data line 17, the pixel electrode 18, and the like will be described with reference to FIG. 7A to 7E. A metal 20b of Cr or the like as the material of the data line 17, the pixel electrode 18, the source electrode, and the drain electrode is formed on the substrate 10 by using a sputtering method or the like. Afterward, a resist 23 is coated on the metal 20b, and the resist 23 is dried (refer to FIG. 7A).

Then, the exposure is performed with an exposure mask 24 having openings corresponding to the data line 17, the pixel electrode 18, the source electrode, and the drain electrode (refer to FIG. 7B). This exposure mask 24 includes openings 24a and 24b corresponding to the pixel electrodes 18. The opening 24a corresponds to the electrode width of the pixel electrode 18a at point A, and the opening 24b corresponds to the electrode width of the pixel electrode 18b in the area with lower transmittance like at point B.

A part of the resist 23 which is not exposed to light is removed by using a developing fluid after exposure, and then the resist pattern such as the resist pattern 23a corresponding to the opening 24a and the resist pattern 23b corresponding to the opening 24b are formed (refer to FIG. 7C).

Next, a metal 20b is etched with the resist pattern as an etching mask (refer to FIG. 7D). Afterward, the resist patterns 23a and 23b are removed using an ashing, an organic solvent, or the like (FIG. 7E reference).

As a result, the electrode width Wp2 corresponding to the resist pattern 23a for the pixel electrode 18b formed in the area with lower transmittance becomes wider than the electrode width Wp1 corresponding to the resist pattern 23a for a pixel electrode 18a formed in the area with higher transmittance. Accordingly, the electrode spacing $L_2$ between the common electrode 13b and the pixel electrode 18b in the area with lower transmittance can be made smaller than the electrode spacing $L_1$ between the common electrode 13a and the pixel electrode 18a in the area with higher transmittance.

After the pixel electrode 18 is formed as described, the resist pattern is formed through exposure with the source electrodes and the drain electrodes of TFTs 16 as an exposure mask, and then, the semiconductor layer 15 is etched by dry etching or the like with this resist pattern as an etching mask, and a channel of this TFT 16 is formed. Afterwards, the interlayer insulating film 19 including a silicon oxide film, a silicon nitride film, or the like shown in FIG. 4B is formed by using a plasma CVD method or the like.

On the other hand, the opposed substrate 5 is formed on an insulating substrate with successive formation of a color layer of each RGB color, a black matrix, a protection film, and a columnar spacer. The color layer of each RGB color is formed corresponding to each pixel region, and the black matrix is formed in the area between each color layer. Afterwards, the protection film is formed to cover the color layer and the black matrix, and the columnar spacers are formed on the protection film.

Next, solution of polyimide as the material of the alignment film is coated upon the TFT substrate 3 and the opposed substrate 5 by using a printer, and is then baked. The surface of the baked alignment film is unidirectionally rubbed by a buff cloth or the like wound around a rotating metallic roller, thus rubbing treatment is performed on this alignment film.

Next, a photocurable sealant or a heat-curable sealant is provided on one of the substrates, and liquid crystal is dropped onto a region surrounded by the sealant. After that, two substrates of the TFT substrate 3 and the opposed substrate 5 are put together overlapped, and ultraviolet curing or heat curing treatment is performed to the sealant, thus the TFT substrate 3 and the opposed substrate 5 is bonded together. And above completes production of the LCD panel 2.

Figure 8:
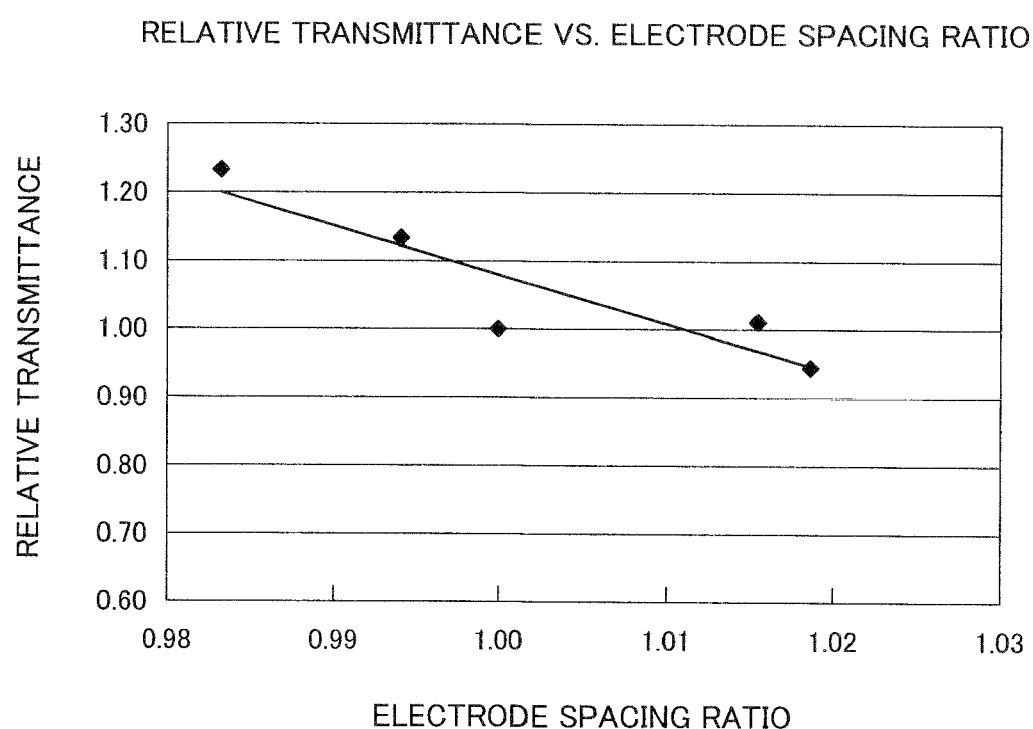
FIG. 8 shows an effect of the LCD apparatus according to the first exemplary embodiment, and indicates correlation between the electrode spacing ratio and the transmittance.

The LCD apparatus 1 is manufactured by combining the backlight unit 7 with the LCD panel 2 produced by the above-mentioned method. FIG. 8 indicates a measured result of the transmittance of this LCD apparatus. The horizontal axis indicates an electrode spacing ratio, and the vertical axis indicates a relative transmittance. In the measurement, the results are measured relative to the reference values of the electrode spacing and the transmittance for the pixel close to the center of the display area 8.

FIG. 8 shows that the relative transmittance becomes higher as the electrode spacing ratio becomes smaller. This result shows that the decline of the transmittance caused by the wiring resistance of the scanning line 11 and the data line 17 can be compensated by the control of the electrode spacing L. This electrode spacing L can be adjusted by the size of the openings 22a and 22b in an exposure mask 22 corresponding to the electrode width of the common electrode 13, by the size of the openings 24a and 24b in the exposure mask 24 corresponding to the electrode width of the pixel electrode 18b, by the coating condition of the resists 21 and 23, by the exposure condition, by the development condition, or the like.

Control target of the electrode spacing L can be calculated by the following formula, considering the transmittance change in an actual LCD panel 2. When $T_1$ denotes the transmittance for the pixel relatively near to the terminal area 9, and $T_2$ denotes the transmittance for the pixel relatively far from the terminal area 9, the relative transmittance $T_2/T_1$ is expressed as follows:

$$T_1 = \alpha \times \mathrm{Sin}^2(2 \times \psi_1)$$

$$T_2 = \alpha \times \mathrm{Sin}^2(2 \times \psi_2)$$

$$T_2/T_1 = \sin^2(2 \times \psi_2)/\sin^2(2 \times \psi_1) \quad (2)$$

$$\alpha = \tfrac{1}{2} \times \sin^2(\pi \times \Delta n \times d/\lambda)$$

ψ: rotation angle of liquid crystal
Δn: refractive index anisotropy of liquid crystal
d: substrate interval
λ: wavelength of light On the other hand, the following relation holds on the basis of the fundamental formula (1) concerning IPS, where the electrode spacing for the pixel relatively near to the terminal area 9 is $L_1$, and the electrode spacing for the pixel relatively far from the terminal area 9 is $L_2$.

$$K_{22} \times d^2\psi/dz^2 = \epsilon_0 \times \Delta\epsilon \times (V/L_1)^2 \times \mathrm{Sin}(\psi_1) \times \cos(\psi_1)$$

$$K_{22} \times d^2\psi/dz^2 = \epsilon_0 \times \Delta\epsilon \times (V/L_2)^2 \times \mathrm{Sin}(\psi_2) \times \cos(\psi_2)$$

Accordingly, the electrode spacing ratio $L_2/L_1$ is expressed as:

$$L_2/L_1 = ((\sin(\psi_2) \times \cos(\psi_2))/(\sin(\psi_1) \times \cos(\psi_1)))^{1/2} \quad (3)$$

$\psi_1$ and $\psi_2$ that are consistent with the relative transmittance $T_2/T_1$ are determined by the formula (2). The electrode spacing ratio $L_2/L_1$ assuming $\psi_1$ and $\psi_2$ can be calculated from the formula (3).

In case of a LCD panel with the characteristics in FIG. 8, the slope of the graph is nearly −7. Accordingly, for example, the relative transmittance $T_2/T_1$ of nearly 15% implies that the electrode spacing ratio $L_2/L_1$ should be adjusted to decrease by only 2.2%, if assuming the characteristics of TFT 16 of each pixel being fixed.

By the above exemplary embodiment, the LCD panel and the LCD apparatus with improved transmittance uniformity over the entire display area both in full contrast display mode and in halftone display mode can be provided.

Next, a LCD panel and a LCD apparatus according to the second exemplary embodiment will be described with reference to FIGS. 9 to 11. In the first exemplary embodiment described previously, the electrode spacing L between the pixel electrode 18 and the common electrode 13 is adjusted by changing the size of the openings 22a, 22b, 24a and 24b on the exposure masks 22 and 24. In contrast, in the second exemplary embodiment, the electrode spacing L is adjusted by changing etching condition, without changing the size of the openings 22a, 22b; 24a and 24b on the exposure masks 22 and 24.

Hereinafter, a method of manufacturing a TFT substrate 3 in this exemplary embodiment is described with reference to process sectional views of FIGS. 9A to 9E. FIG. 9 shows process sectional views, showing the part of the steps of manufacturing the TFT substrate 3 at pixels of point A and point B. The left side of FIG. 9 indicates the part of the pixel of point A in FIG. 2, and the right side of FIG. 9 indicates the part of the pixel of point B in FIG. 2.

First, a metal 20a of Cr or the like as the material of the scanning line 11, the common line 12, and the common electrode 13, is deposited by using a sputtering method or the like on an insulating substrate 10 of glass, plastics or the like, as in the first exemplary embodiment. Then a resist 21 is coated upon this metal 20a, and the resist 21 is dried afterward (refer to FIG. 9A).

Next, the resist 21 is exposed using an exposure mask 22 with openings 22c whose sizes are the same for the pixel electrode 18 and the common electrode 13 both at point A and point B (refer to FIG. 9B). After that, a part of the resist 21 which is not exposed to light is removed by using a developing fluid, thus the resist pattern 21c is formed (refer to FIG. 9C).

Next, the substrate 10 is dipped in an etchant, and the metal 20a is etched with the resist pattern 21c as an etching mask. When the substrate 10 is dipped in an etchant, a part of the substrate 10 with higher transmittance like point A is dipped first into the etchant. When taking out the substrate 10 from the etchant, whole of the substrate 10 is taken out simultaneously (refer to FIG. 9D). After that, the resist 21 is removed by using an ashing, an organic solvent, or the like. In this way, the common electrode 13a with electrode width Wc1 and the common electrode 13b with electrode width Wc2 are formed (refer to FIG. 9E).

FIGS. 10A and 10B illustrate procedures of dipping the substrate 10 into an etchant. FIG. 10A indicates a case for dipping the substrate 10 in an etchant from the side of point B, and FIG. 10B indicates a case for dipping the substrate 10 in an etchant from the side of point A. Thus, when a substrate 10 is dipped in an etchant, the temporal duration of etching for point A and point B can be made different by making the timing of the dipping different between point A and point B.

In this exemplary embodiment, a case that the substrate 10 is dipped into an etchant from the side of point A, as shown in FIG. 10B, is adopted. Hence, as the pixel gets closer to the point A, the etching time becomes longer, and the metal 20a under the resist 21 is further over-etched, thus the electrode width Wc1 of the common electrode 13a becomes narrower than the electrode width Wc2 of the common electrode 13b. Narrower electrode width Wc1 of the common electrode 13a means broadening of the electrode spacing L between the common electrode 13a and the pixel electrode 18.

Next, by steps not shown in drawings, a semiconductor layer 15, a data line 17, a source electrode, a drain electrode, and a pixel electrode 18 are produced. First, a gate electrode insulating film 14 including a silicon oxide film, a silicon nitride film, or the like is formed by using a plasma CVD method or the like. After amorphous silicon or polysilicon is deposited on this gate electrode insulating film 14, a resist is coated on the layer of amorphous silicon, polysilicon, or the like.

Next, the substrate is exposed using an exposure mask with openings corresponding to the semiconductor layer 15, and the resist pattern corresponding to this semiconductor layer 15 is formed. Amorphous silicon, polysilicon, or the like is etched by dry etching or the like with this resist pattern as an etching mask. As a result, the island-shaped semiconductor layer 15 can be formed.

Next, a metal of Cr or the like to become the data line 17, the source electrode, the drain electrode, and the pixel electrode 18 is formed by using a sputtering method or the like. Etching is performed so that the etching time difference occurs, similar to the case for the common electrode 13. Therefore, for example, the electrode width of the pixel electrode 18 for the pixel near terminal area 9 like point A can be made narrower.

After that, a LCD panel 2 is formed by using the similar method as in the first exemplary embodiment. Thus, the similar effect as in the first exemplary embodiment is obtained by introducing the etching time difference that makes the electrode width of the common electrode 13 and the pixel electrode 18 narrower in the display area with higher transmittance.

In order to confirm the effect of the method to introduce the time difference to the above-mentioned etching, the transmittance distribution of the TFT substrate 3 manufactured by this method was measured.

Figure 11A:
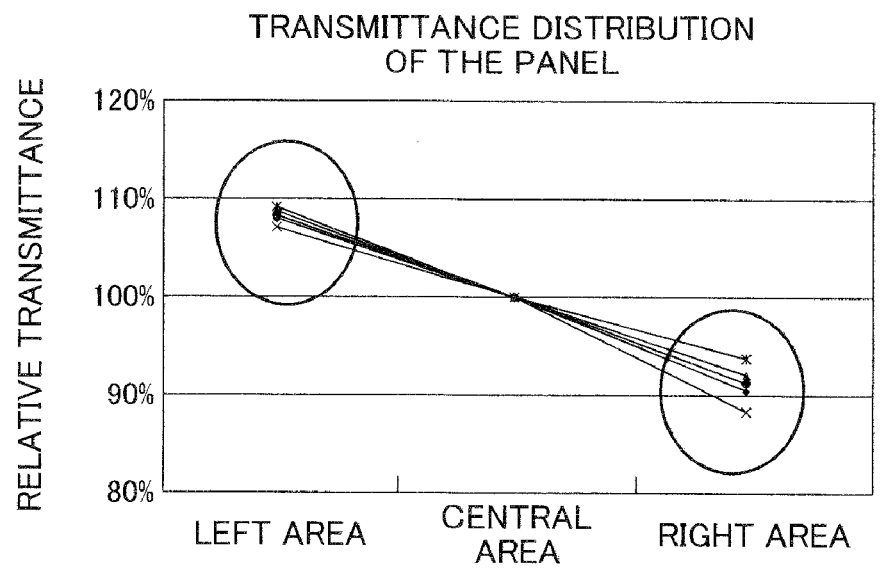
FIGS. 11A and 11B show an effect of the LCD apparatus according to the second exemplary embodiment, and indicate a change in transmittance distribution for different etching steps.
Figure 11B:
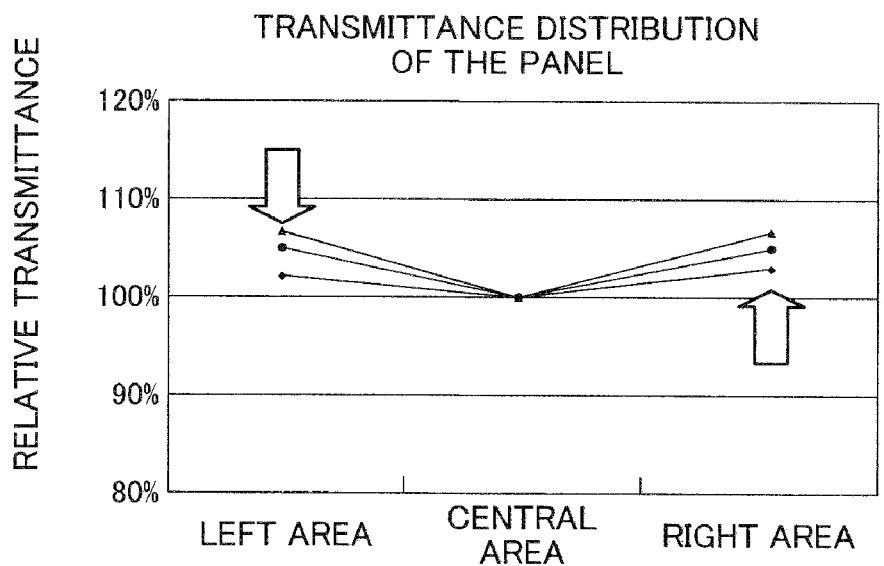

FIGS. 11A and 11B show the distribution of the relative transmittance for the LCD panel 2, measured relative to the transmittance of the pixel at nearly the center of the display area 8. FIG. 11A indicates the relative transmittance when dipping the substrate 10 in an etchant first from the area far from the terminal area 9, and FIG. 11B indicates the relative transmittance when dipping a substrate 10 in an etchant first from the area close to the terminal area 9.

FIG. 11A shows that the relative transmittance changes greatly for the substrate 10 dipped in an etchant first from the area of lower transmittance. This is because the area with the lower transmittance is more substantially over-etched, thus an electrode spacing between the common electrode 13 and the pixel electrode 18 in the area with lower transmittance (the right area) became wider than the electrode spacing in the area with higher transmittance (the left area), thereby increasing the difference in transmittance between these areas.

On the other hand, FIG. 11B shows that the relative transmittance exhibits uniformity over the entire display area when a substrate is dipped in an etchant first from the area with higher transmittance. This is because the area with the higher transmittance (the left area) is more substantially over-etched, thus the electrode spacing between the common electrode 13 and the pixel electrode 18 in the area became wider than the electrode spacing in the area with lower transmittance (the right area), thereby decreasing the difference in transmittance between these areas.

By the above exemplary embodiment, the LCD panel and the LCD apparatus with improved transmittance uniformity over the entire display area can be provided both in full contrast display mode and in halftone display mode.

Next, the third exemplary embodiment will be described. In the first and the second exemplary embodiments mentioned previously, the transmittance was adjusted by varying the electrode spacing L between the pixel electrode 18 and the common electrode 13. In contrast, in the third exemplary embodiment, the transmittance is adjusted by varying the substrate interval d between the TFT substrate 3 and the opposed substrate 5.

As understood from the formula (1), the optical threshold voltage Vc of the liquid crystal becomes smaller when a substrate interval d between the TFT substrate 3 and the opposed substrate 5 is made larger, thus, the transmittance of the LCD panel can be made relatively larger as a whole for the same applied voltage.

The substrate interval d between the TFT substrate 3 and the opposed substrate 5 is usually determined by columnar spacers of the resist pattern formed on the opposed substrate 5. Accordingly, in this exemplary embodiment, the height of this resist pattern is adjusted depending on the pattern's distance from the terminal area 9.

Figure 12A:
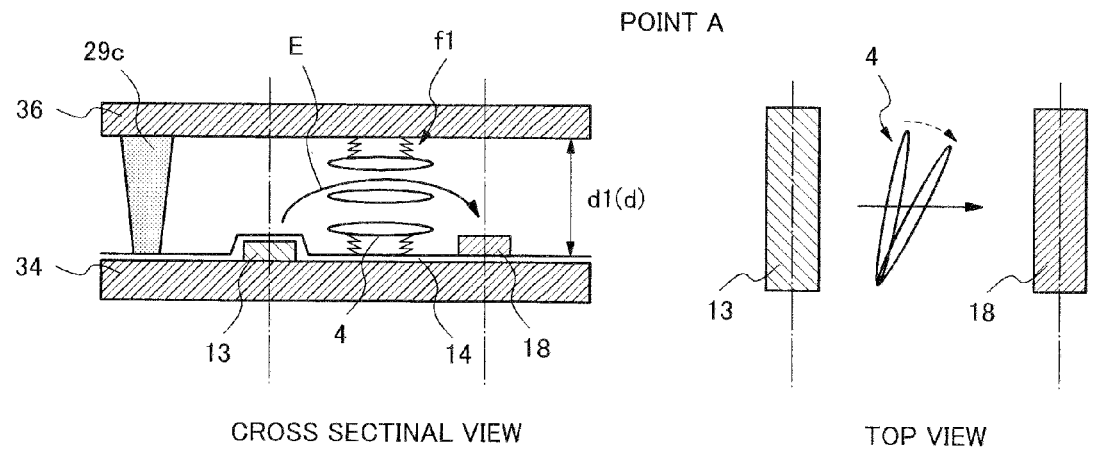
FIGS. 12A and 12B are a cross sectional view and a top view which illustrate the part of the pixel in the region of relatively far from and relatively near to an input terminal of either a scanning line or a data line according to the third exemplary embodiment.
Figure 12B:
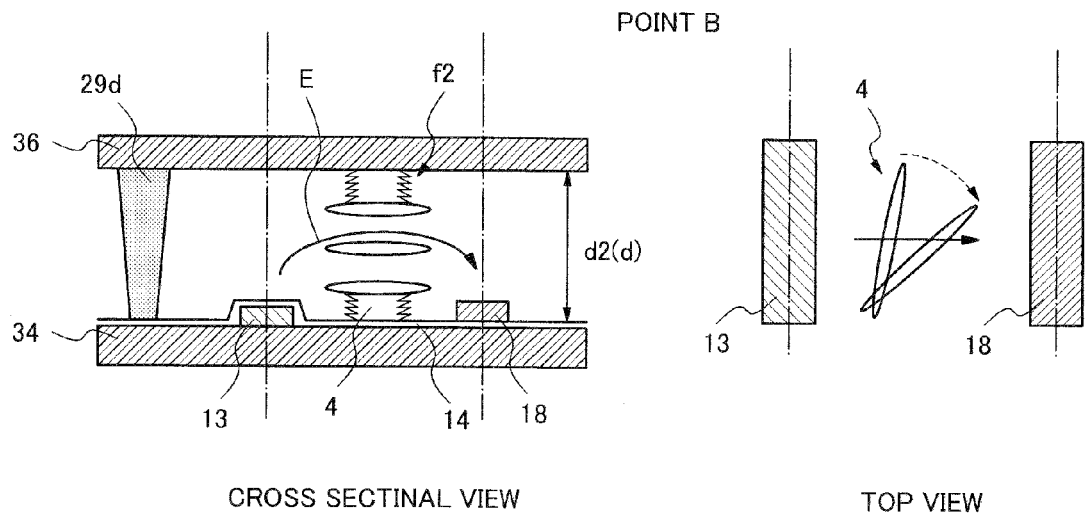

FIG. 12A shows a cross sectional view and a top view of the pixel at point A, near the terminal area 9. And FIG. 12B shows a cross sectional view and a top view of the pixel at point B, far from the terminal area 9.

As shown in FIG. 12A, the substrate interval d of the pixel at point A is d1 with smaller interval. As a result, the liquid crystal 4 is subjected to large orientation restraining force f1. On the other hand, as shown in FIG. 12B, the substrate interval d of the pixel at point B is d2 with larger interval. As a result, the liquid crystal 4 is subjected to small orientation restraining force f2.

Thus, even if rubbing treatment is performed in the same condition, the orientation restraining force f varies with a change in substrate interval d. This orientation restraining force f has an influence on the rotation angle of the liquid crystal 4, where the rotation angle determines the transmittance. Hence, the transmittance can be adjusted by varying the substrate interval d.

The columnar spacers 29c and 29d may be formed on the TFT substrate 3, or may be formed both on the opposed substrate 5 and the TFT substrate 3. In other modifications, with the height of the columnar spacers 29c and 29d being constant, the substrate interval d between the TFT substrate 3 and the opposed substrate 5 may be varied by changing the thickness of the films on the substrates; such as the interlayer insulating film 19, the planarizing layer, and the alignment film on the TFT substrate 3; and the black matrix, the protection film, and the alignment film on the opposed substrate 5.

Figure 13A:
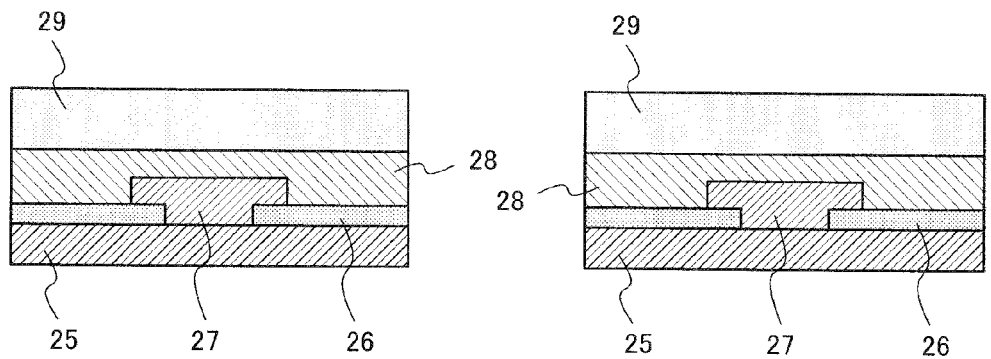
FIGS. 13A to 13C are process sectional views indicating a part of the method of manufacturing the opposed substrate according to the third exemplary embodiment.
Figure 13B:
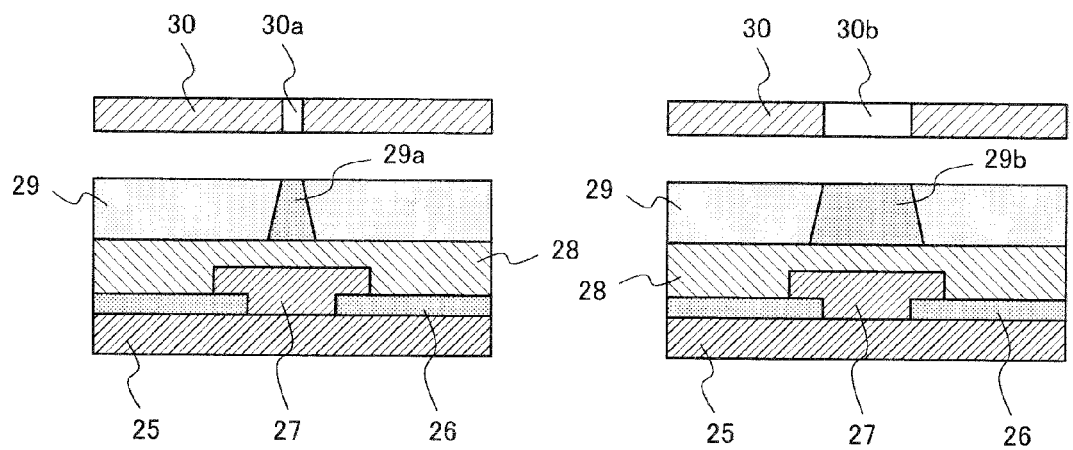
Figure 13C:
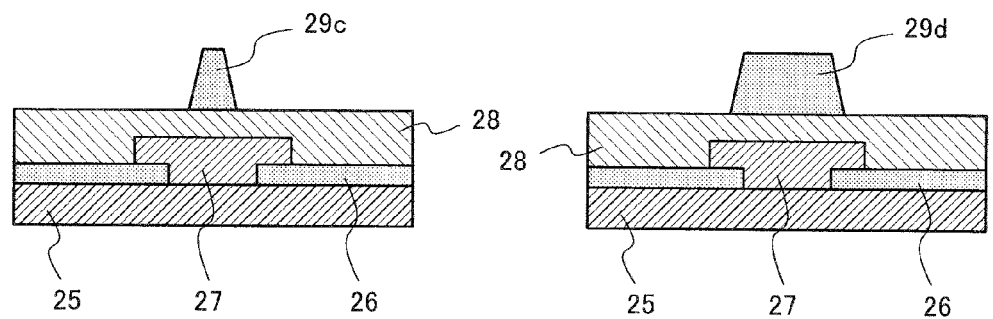

Next, an example of manufacturing a LCD panel 2 with varying the height of the columnar spacers 29c and 29d is described. FIG. 13A to FIG. 13C are process sectional views showing the part of the manufacturing steps of this LCD panel. In the views, a cross sectional view of the pixel at point A is indicated on the left side of FIG. 13, and a cross sectional view of the pixel at point B is indicated on the right side of FIG. 13.

First, the color layer 26 of each RGB color is formed on the insulating substrate 25 of glass, plastics, or the like. After that, the black matrix 27 is formed in an area between the color layers 26, and the protection film 28 is formed on it.

Next, a photosensitive resist 29 is coated on the protection film 28, and the resist 29 is dried after that (refer to FIG. 13A). The substrate is then exposed using an exposure mask 30 having openings 30a and 30b (refer to FIG. 13B). After exposing, the unexposed resist is removed by etching, and the resist pattern is formed (refer to FIG. 13C).

On the mask, the opening 30a for the point A is set smaller than the opening 30b for the point B. Since light which enters the resist 29 is scattered inside the resist 29, the light component propagating in a transversal direction perpendicular to the incident direction appears. For this reason, the exposed region of the resist 29 becomes the exposed areas 29a and 29b having a trapezoidal shape, the top surface of which corresponds to the openings 30a and 30b, respectively.

As an opening area is smaller, the ratio of the light energy spreading in a horizontal direction increases among the total energy passing the opening. Therefore, as an opening area becomes smaller, the absorbed energy in the resist 29 just under the opening tends to decrease, thus the exposure dose becomes insufficient.

When etched in the situation described above, the surface side (the opening 30a side) of the exposed area 29a which is exposed to light insufficiently by smaller opening area tends to be over-etched more easily than the surface side (the opening 30b side) of the exposed area 29b under a larger opening area. Accordingly, the height of the columnar spacer 29c corresponding to the exposed area 29a under a smaller opening area becomes lower than the height of the columnar spacer 29d corresponding to the exposed area 29b under a larger opening area.

Next, the alignment film is formed on the TFT substrate 3 and the opposed substrate 5 formed in the steps described above, and rubbing treatment is then performed upon the alignment film. A sealant of photo-curability or thermocurability is then provided on one of the substrates, and liquid crystal is dropped in the region surrounded by the sealant.

After dropping of the liquid crystal is completed, the two substrates are put together overlapped and ultraviolet curing or heat curing of the sealant is performed. By the above, the LCD panel 2 can be formed.

Figure 14:
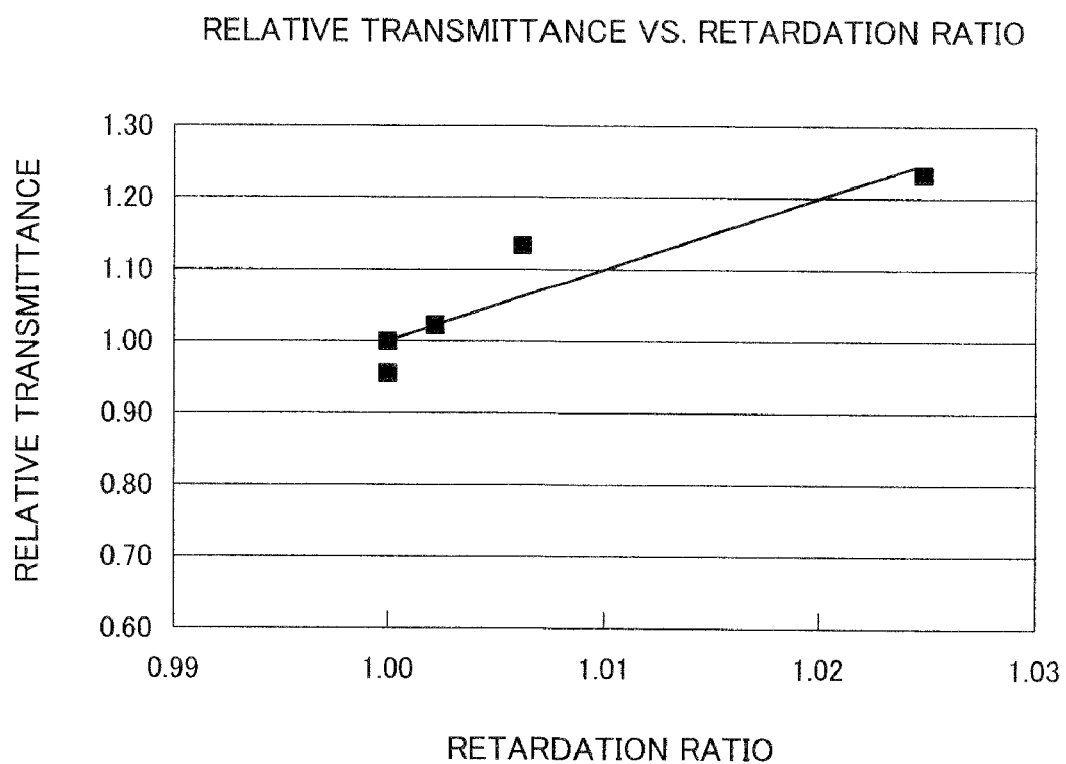
FIG. 14 shows an effect of the LCD apparatus according to the third exemplary embodiment, and indicates correlation between the retardation ratio (the substrate spacing ratio) and the relative transmittance.
Figure 15:
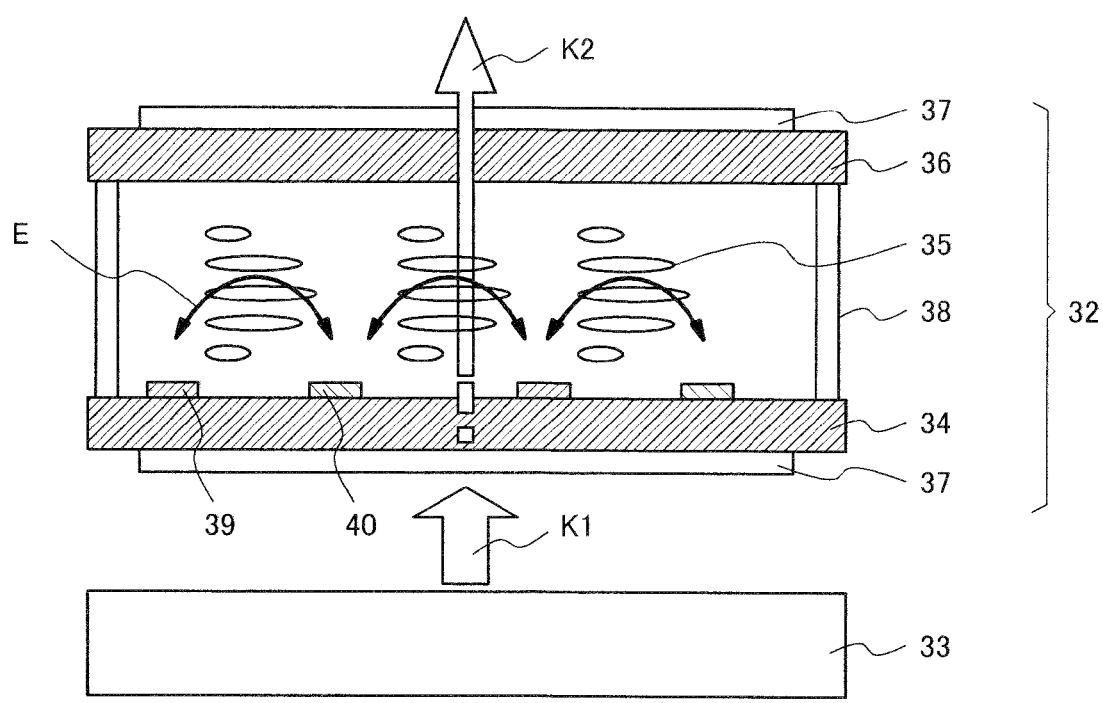
FIG. 15 is a cross sectional view showing operation of the LCD apparatus.
Figure 16:
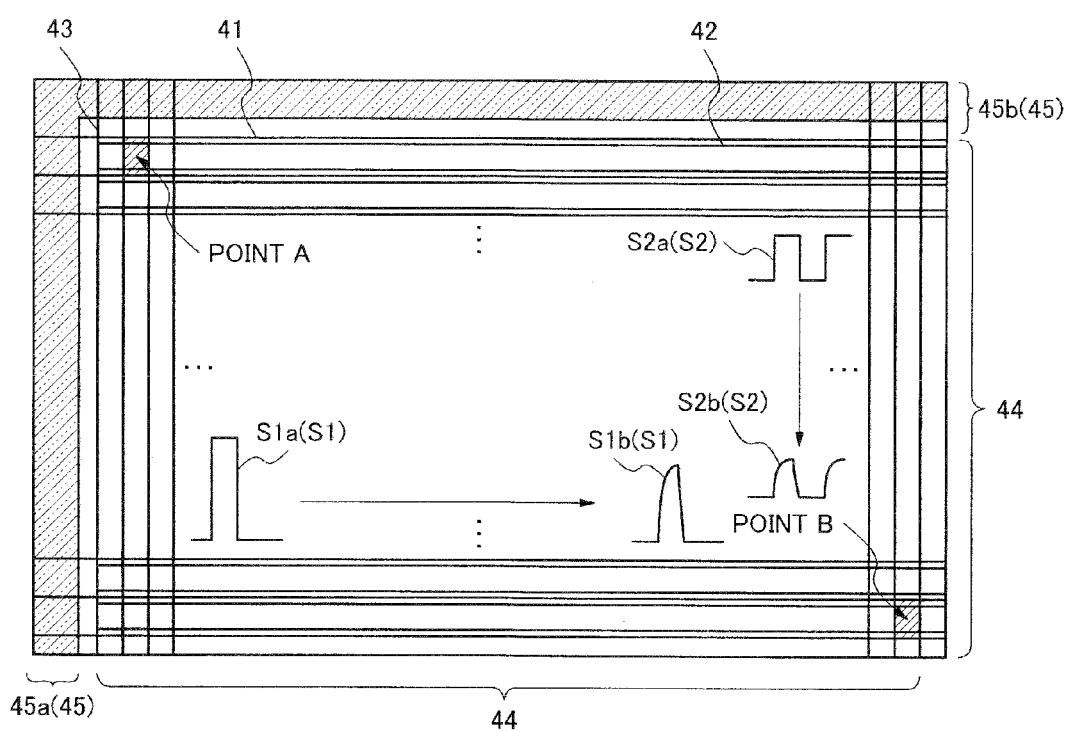
FIG. 16 shows the composition of the TFT substrate and a signal delay.
Figure 17A:
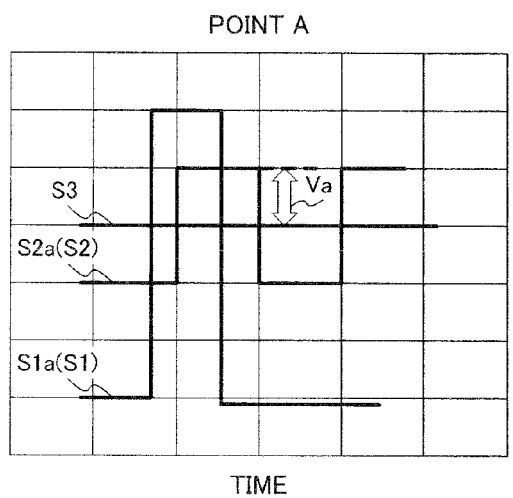
FIGS. 17A and 17B show waveform changes in the scanning signal and the data signal.
Figure 17B:
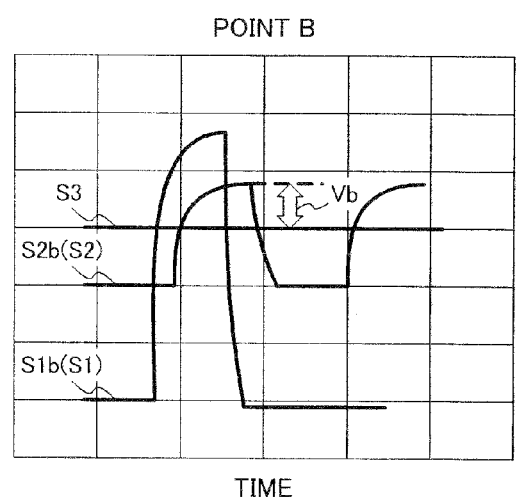
Figure 18:
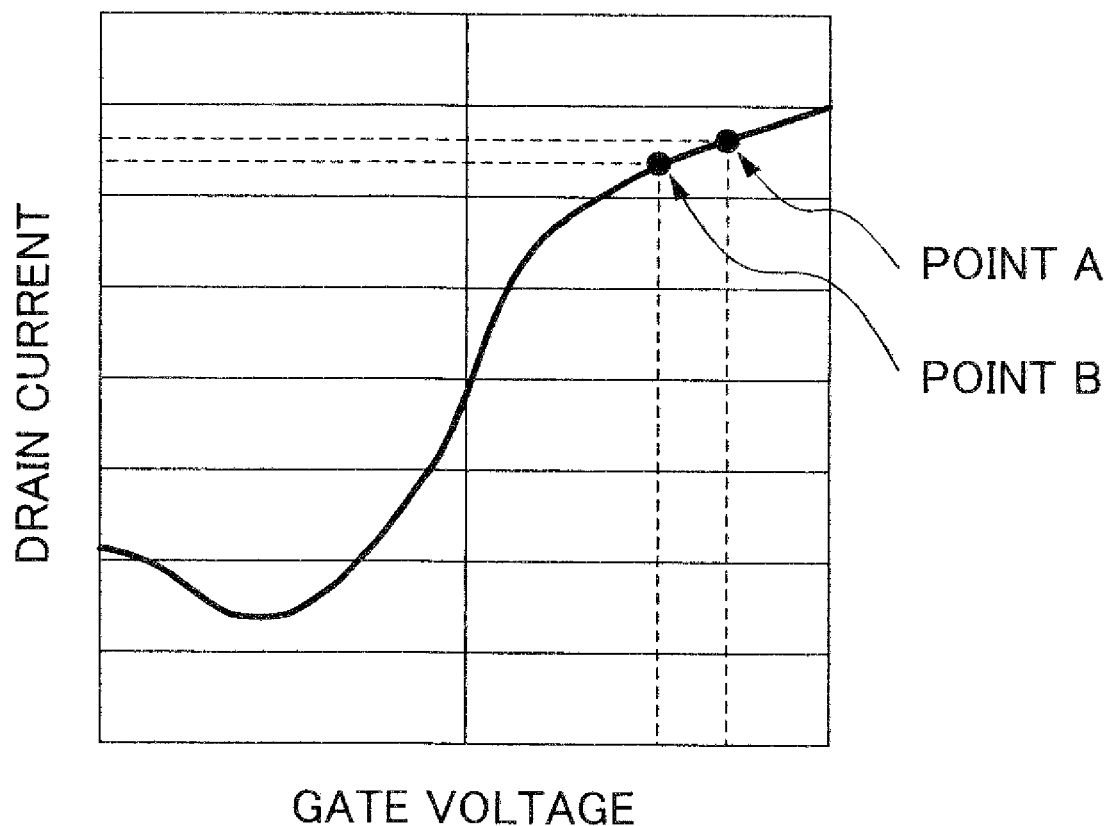
FIG. 18 shows a change of the drain current of the TFT by the voltage drop of the scanning signal.
Figure 19:
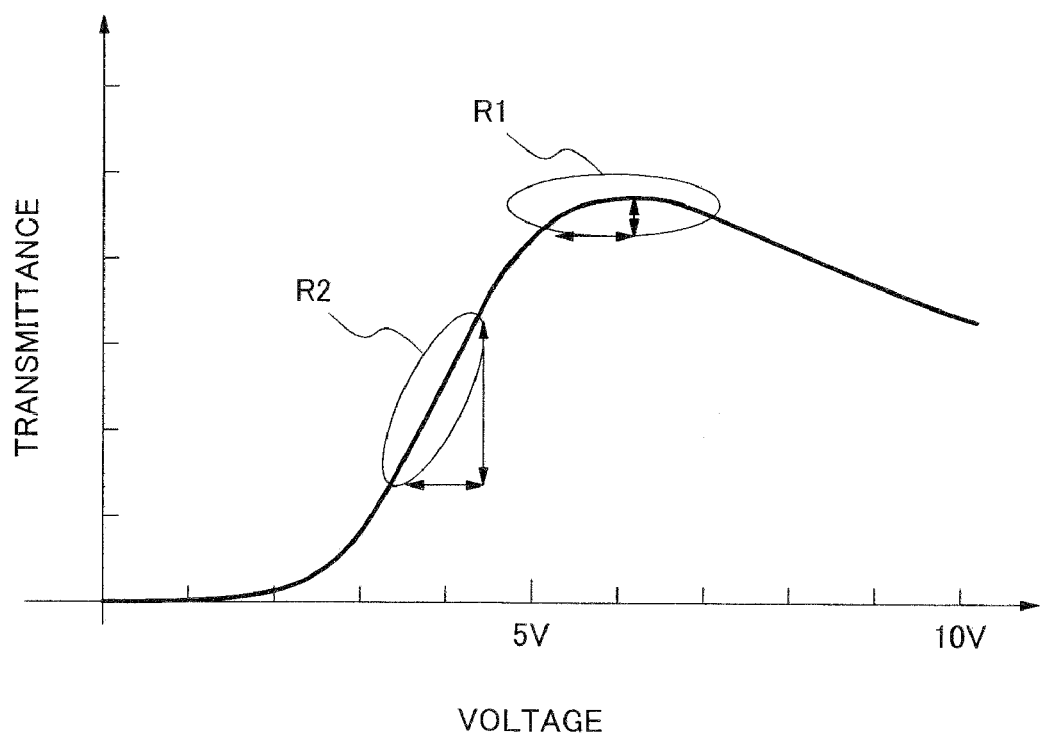
FIG. 19 shows the voltage-transmittance characteristics of the liquid crystal; and, FIGS. 20A to 20C show the transmittance distribution of the related LCD apparatus in full contrast display mode and in halftone display mode.
Figure 20A:
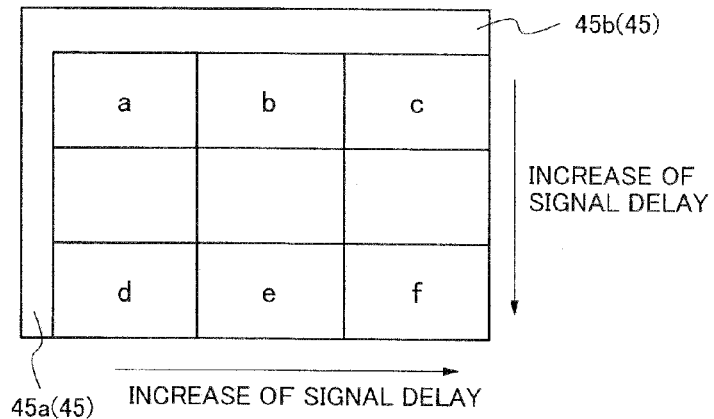
Figures 20B, 20C:
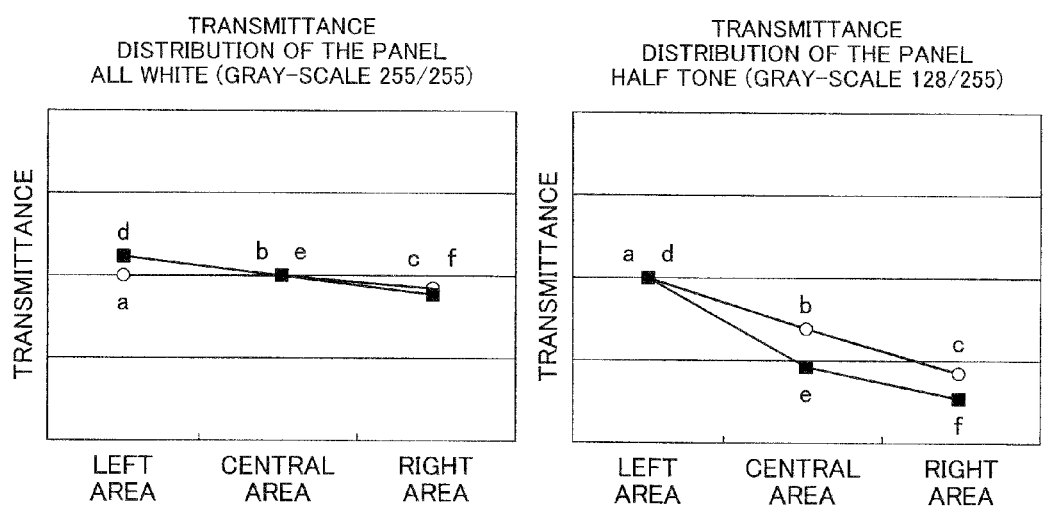

The transmittance of each part of the display area 8 was measured after the LCD panel 2 formed by the above-mentioned method were combined with the backlight unit 7. FIG. 14 shows the measured correlation between the retardation ratio and the relative transmittance, and also shows the measured correlation between the substrate interval ratio and the relative transmittance, measured relatively to the reference values of the substrate interval and the transmittance of the near central pixel in the display area 8, respectively. In the above, since the retardation ratio is a substrate interval multiplied by the refractive index anisotropy, the retardation ratio is equivalent to the substrate interval ratio.

FIG. 14 shows that the substrate interval ratio is proportional to the relative transmittance. This result thus verifies that the difference in the transmittance caused by the wiring resistance of the scanning line 11 or the data line 17 can be compensated by adjusting the substrate interval d.

The vertical height difference between these columnar spacers 29c and 29d can be adjusted by the size of the openings 30a and 30b of the exposure mask 30, and by several conditions in, such as coating, exposure, and development of the resist 29. Accordingly, the target of the substrate interval ratio is determined considering the transmittance change in an actual LCD panel 2. The value of the substrate interval ratio can be calculated from the following equations.

When denoting the transmittance of the pixel near terminal area 9 as $T_1$, its corresponding substrate interval as $d_1$, the transmittance of the pixel far from the terminal area 9 as $T_2$, and the corresponding substrate interval as $d_2$, the transmittances $T_1$ and $T_2$ are represented as follows:

$$T_1 = \frac{1}{2} \times \sin^2(\beta \times \Delta n \times d_1) \times \sin^2(2 \times \psi) \tag{}$$

$$T_2 = \frac{1}{2} \times \sin^2(\beta \times \Delta n \times d_2) \times \sin^2(2 \times \psi) \tag{}$$

where, $\beta = \pi/\lambda$
ψ: liquid crystal rotation angle
Δn: refractive index anisotropy of liquid crystal
λ: wavelength of the light Accordingly, the relative transmittance $T_2/T_1$ is expressed as:

$$T_2/T_1 = \sin^2(\beta \times \Delta n \times d_2)/\sin^2(\beta \times \Delta n \times d_1) \tag{4}$$

From the formula (4), $\Delta n \times d_1$ and $\Delta n \times d_2$ which are consistent with $T_2/T_1$ can be calculated.

The slope of the graph in FIG. 14 is nearly 10. Accordingly, when the relative transmittance between areas with lower transmittance and higher transmittance is nearly 15%, the relative retardation ratio is adjusted to be approximately 1.5% larger, with supposing the characteristics of a TFT 16 for each pixel being equal. In this way, the adjustment of the transmittance becomes possible.

In the first and the second exemplary embodiments, the electrode spacing between the common electrode 13 and the pixel electrode 18 is varied, and in the third exemplary embodiment the substrate interval between the TFT substrate 3 and the opposed substrate 5 is varied. However, the present invention is not limited to the exemplary embodiments. For example, a combined configuration of varying the electrode spacing and the substrate interval is also possible.

Although the LCD panel of an IPS type was described in the first to the third exemplary embodiments, the above-mentioned methods are also applicable to a LCD panel of other types, such as VA (Vertical Alignment) type.

As has been described above, the present invention can provide the LCD panel of improved transmittance uniformity over the entire display area both in full contrast display mode and in halftone display mode, the manufacturing method of the panel, and the LCD apparatus.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:
1. A liquid crystal display panel, comprising:
a TFT connected to wiring equipped with an input terminal;
a pixel electrode connected to said TFT; and
a common electrode opposed to the pixel electrode,
wherein an electrode spacing between the pixel electrode and the common electrode is adjusted depending on the amount of a signal degradation that arises from a signal flow from the input terminal through the wiring to said TFT, and a relative transmittance $T_2/T_1$ and an electrode spacing ratio $L_2/L_1$ satisfy following relations:

$$T_2/T_1 = \sin^2(2 \times \psi_2)/\sin^2(2 \times \psi_1);$$

and $$L_2/L_1 = ((\sin(\psi_2) \times \cos(\psi_2))/(\sin(\psi_1) \times \cos(\psi_1)))^{1/2};$$

wherein $T_1$, $L_1$, and $\psi_1$ represent a transmittance of the pixel, the electrode spacing between the common electrode and the pixel electrode, and a liquid crystal rotation angle, respectively, for the pixel relatively near said input terminal, and $T_2$, $L_2$, and $\psi_2$ represent the transmittance of the pixel, the electrode spacing between the common electrode and the pixel electrode, and the liquid crystal rotation angle, respectively, for the pixel relatively far from said input terminal.

2. A liquid crystal display panel, comprising:
a TFT connected to wiring equipped with an input terminal;
a pixel electrode connected to said TFT; and
a common electrode opposed to the pixel electrode,
wherein an electrode spacing between the pixel electrode and the common electrode is adjusted depending on the amount of a signal degradation that arises from a signal flow from the input terminal through the wiring to said TFT, and the electrode spacing between the common electrode and the pixel electrode is adjusted by varying at least one of a common electrode width and a pixel electrode width, and wherein said input terminal is a first input terminal connected to a gate electrode of said TFT, and an electrode spacing between the pixel electrode and the common electrode is set smaller as the distance between said first input terminal and said TFT is increased.

3. A liquid crystal display panel, comprising:
a TFT connected to wiring equipped with an input terminal;
a pixel electrode connected to said TFT; and
a common electrode opposed to the pixel electrode,
wherein an electrode spacing between the pixel electrode and the common electrode is adjusted depending on the amount of a signal degradation that arises from a signal flow from the input terminal through the wiring to said TFT, and the electrode spacing between the common electrode and the pixel electrode is adjusted by varying at least one of a common electrode width and a pixel electrode width, and
wherein said input terminal is a second input terminal connected to a drain electrode of said TFT, and the electrode spacing between the pixel electrode and the common electrode is set smaller as the distance between said second input terminal and said TFT is increased.

4. A liquid crystal display panel, comprising:
a TFT connected to wiring equipped with an input terminal;
a pixel electrode connected to said TFT; and
a common electrode opposed to the pixel electrode,
wherein an electrode spacing between the pixel electrode and the common electrode is adjusted depending on the amount of a signal degradation that arises from a signal flow from the input terminal through the wiring to said TFT, and the electrode spacing between the common electrode and the pixel electrode is adjusted by varying at least one of a common electrode width and a pixel electrode width, and
wherein said input terminal is a first input terminal connected to a gate electrode of said TFT and a second input terminal connected to a drain electrode of said TFT, and the electrode spacing between the pixel electrode and the common electrode is set smaller as the distance between said first input terminal, said second input terminal, and said TFT is increased.

5. A liquid crystal panel with a liquid crystal being sandwiched between a pair of opposing substrates, comprising:
a TFT connected to wiring equipped with an input terminal;
a pixel electrode connected to said TFT;
a common electrode opposed to the pixel electrode; and
a substrate interval being adjusted depending on the amount of a signal degradation arising from the signal flow from said input terminal through said wiring to said TFT,
wherein the substrate interval $d_1$ and $d_2$ satisfy a following relation;

$$T_2/T_1 = \sin^2(\beta \times \Delta n \times d_2)/\sin^2(\beta \times \Delta n \times d_1);$$

wherein a transmittance of a pixel relatively near said input terminal is $T_1$ and the substrate interval at said pixel is $d_1$, the transmittance of the pixel relatively far from said input terminal is $T_2$ and the substrate interval at said pixel is $d_2$, and $\Delta n$ represents a refractive index anisotropy of the liquid crystal.

6. A liquid crystal display panel with a liquid crystal being sandwiched between a pair of opposing substrates, comprising:
a TFT connected to wiring equipped with an input terminal;
a pixel electrode connected to said TFT;
a common electrode opposed to the pixel electrode; and
a substrate interval being adjusted depending on the amount of a signal degradation arising from the signal flow from said input terminal through said wiring to said TFT,
wherein said input terminal is the first input terminal connected to a gate electrode of said TFT, and the substrate interval is set wider as a distance between said first input terminal and said TFT is increased.

7. A liquid crystal display panel with a liquid crystal being sandwiched between a pair of opposing substrates, comprising:
a TFT connected to wiring equipped with an input terminal;
a pixel electrode connected to said TFT;
a common electrode opposed to the pixel electrode; and
a substrate interval being adjusted depending on the amount of a signal degradation arising from the signal flow from said input terminal through said wiring to said TFT,
wherein said input terminal is the second input terminal connected to a drain electrode of said TFT, and the substrate interval is set wider as a distance between said second input terminal and said TFT is increased.

8. A liquid crystal display panel with a liquid crystal being sandwiched between a pair of opposing substrates, comprising:
a TFT connected to wiring equipped with an input terminal;
a pixel electrode connected to said TFT;
a common electrode opposed to the pixel electrode; and
a substrate interval being adjusted depending on the amount of a signal degradation arising from the signal flow from said input terminal through said wiring to said TFT,
wherein said input terminal is the first input terminal line connected to a gate electrode of said TFT and the second input terminal connected to a drain electrode of said TFT, and the substrate interval is set wider as a distance between said first input terminal, said second input terminal, and said TFT is increased.

9. The liquid crystal display panel according to any one of claims 5 to 8, wherein:
columnar spacers defining the interval of a pair of the substrates are disposed, and an interval of said substrates is adjusted by varying heights of the columnar spacers.

* * * * *